US008705368B1

(12) United States Patent
Abts et al.

(10) Patent No.: US 8,705,368 B1
(45) Date of Patent: Apr. 22, 2014

(54) PROBABILISTIC DISTANCE-BASED ARBITRATION

(75) Inventors: Dennis Charles Abts, Eau Claire, WI (US); Michael Marty, Madison, WI (US)

(73) Assignee: Google Inc., Mountain View, CA (US)

( * ) Notice: Subject to any disclaimer, the term of this patent is extended or adjusted under 35 U.S.C. 154(b) by 594 days.

(21) Appl. No.: 12/959,748

(22) Filed: Dec. 3, 2010

(51) Int. Cl.
*H04L 12/26* (2006.01)
*H04L 12/28* (2006.01)
*H04Q 11/00* (2006.01)
*H04L 1/00* (2006.01)
*H04J 3/14* (2006.01)
*H04J 1/16* (2006.01)
*H04L 12/54* (2013.01)
*H04L 12/70* (2013.01)
*H04W 84/18* (2009.01)

(52) U.S. Cl.
CPC ....... *H04L 12/569* (2013.01); *H04L 2012/5679* (2013.01); *H04W 84/18* (2013.01)
USPC ........... 370/238; 370/328; 370/461; 370/462; 370/463

(58) Field of Classification Search
CPC ............... H04L 2012/5678; H04L 2012/5079; H04W 84/18
See application file for complete search history.

(56) References Cited

U.S. PATENT DOCUMENTS 6,665,742 B2 * 12/2003 Owen et al. ..................... 710/10
6,778,531 B1 * 8/2004 Kodialam et al. ............. 370/390
2003/0097461 A1 * 5/2003 Barham et al. ................. 709/235
2006/0179158 A1 * 8/2006 Randriamasy et al. ....... 709/238
2009/0296719 A1 * 12/2009 Maier et al. .................... 370/400

OTHER PUBLICATIONS

J. W. Lee, M. C. Ng, and K. Asanovic, "Globally-synchronized frames for guaranteed quality-of-service in on-chip networks," in ISCA, Beijing, China, 2008, pp. 89-100.
B. Grot, S. W. Keckler, and O. Mutlu, "Preemptive virtual clock: A flexible, efficient, and cost-effective qos scheme for networks-on-a-chip," in MICRO, New York, NY, 2009.
D. Stiliadis and A. Varma, "Design and analysis of frame-based fair queueing: a new traffic scheduling algorithm for packet-switched networks," in SIGMETRICS, Philadelphia, PA, 1996, pp. 104-115.
D. Abts, N. D. Enright Jerger, J. Kim, D. Gibson, and M. H. Lipasti, "Achieving predictable performance through better memory controller placement in many-core cmps," in ISCA, Austin, TX, 2009, pp. 451-461.

(Continued)

*Primary Examiner* — Hassan Phillips
*Assistant Examiner* — Lonnie Sweet
(74) *Attorney, Agent, or Firm* — Lerner, David, Littenberg, Krumholz & Mentlik, LLP

(57) ABSTRACT

Probabilistic arbitration is combined with distance-based weights to achieve equality of service in interconnection networks, such as those used with chip multiprocessors. This arbitration desirably used incorporates nonlinear weights that are assigned to requests. The nonlinear weights incorporate different arbitration weight metrics, namely fixed weight, constantly increasing weight, and variably increasing weight. Probabilistic arbitration for an on-chip router avoids the need for additional buffers or virtual channels, creating a simple, low-cost mechanism for achieving equality of service. The nonlinearly weighted probabilistic arbitration includes additional benefits such as providing quality-of-service features and fairness in terms of both throughput and latency that approaches the global fairness achieved with age-base arbitration. This provides a more stable network by achieving high sustained throughput beyond saturation. Each router or switch in the network may include an arbiter to apply the weighted probabilistic arbitration.

13 Claims, 27 Drawing Sheets

1400

1402    1404

(56) References Cited

OTHER PUBLICATIONS

D. Abts and D. Weisser, "Age-based packet arbitration in large-radix k-ary n-cubes," in SC '07, Reno, Nevada, 2007, pp. 1-11.
C. Bienia, S. Kumar, J. P. Singh, and K. Li., "The PARSEC Benchmark Suite: Characterization and Architectural Implications," in International Conference on Parallel Architectures and Compilation Techniques, 2008.
M. M. K. Martin, D. J. Sorin, B. M. Beckmann, M. R. Marty, M. Xu, A. R. Alameldeen, K. E. Moore, M. D. Hill, and D. A. Wood, "Multifacet's general execution-driven multiprocessor simulator (gems) toolset," SIGARCH Comp. Arch. News, vol. 33, No. 4, pp. 92-99, 2005.
A. Demers, S. Keshav, and S. Shenker, "Analysis and simulation of a fair queueing algorithm," in SIGCOMM, Austin, Texas, 1989, pp. 1-12.
S. Vangal, J. Howard, G. Ruhl, S. Dighe, H. Wilson, J. Tschanz, D. Finan, P. Iyer, A. Singh, T. Jacob, S. Jain, S. Venkataraman, Y. Hoskote, and N. Borkar, "An 80-tile 1.28TFLOPS network-on-chip in 65nm CMOS," ISSCC, pp. 98-589, Feb. 2007.
P. Gratz, C. Kim, R. McDonald, S. Keckler, and D. Burger, "Implementation and Evaluation of On-Chip Network Architectures," in ICCD, 2006.
D. Wentzlaff, P. Griffin, H. Hoffmann, L. Bao, B. Edwards, C. Ramey, M. Mattina, C.-C. Miao, J. Brown, and A. Agarwal, "On-chip interconnection architecture of the tile processor," IEEE Micro, vol. 27, No. 5, pp. 15-31, Sep.-Oct. 2007.
H. Wang, L. S. Peh, and S. Malik, "Power-driven Design of Router Microarchitectures in On-chip Networks," in MICRO, 2003, pp. 105-116.
A. Kumar, P. Kundu, A. Singh, L.-S. Peh, and N. Jha, "A 4.6tbits/s3.6ghz single-cycle noc router with a novel switch allocator in 65nmcmos," in ICCD, Oct. 2007.
L.-S. Peh and W. J. Daily, "A delay model and speculative architecture for pipelined routers," in HPCA, 2001.
C. A. Waldspurger and W. E. Weihl, "Lottery scheduling: flexible proportional-share resource management," in OSDI, 1994.
K. Lahiri, A. Raghunathan, and G. Lakshminarayana, "Lotterybus: a new high-performance communication architecture for system-on-chip designs," in DAC, Las Vegas, Nevada, 2001, pp. 15-20.
I. Hur and C. Lin, "Adaptive history-based memory schedulers," in MICRO, 2004, pp. 343-354.
R. Das, O. Mutlu, T. Moscibroda, and C. R. Das, "Aergia: exploiting packet latency slack in on-chip networks," in ISCA, Saint-Malo, France, 2010, pp. 106-116.
J. H. Kim and A. A. Chien, "Rotating Combined Queueing (RCQ): Bandwidth and latency guarantees in low-cost, high-performance networks," in ISCA, Philadelphia, PA, 1996, pp. 226-236.
K. Goossens, J. Dielissen, and A. Radulescu, "Æthereal network on chip: Concepts, architectures, and implementations," IEEE Des. Test, vol. 22, No. 5, pp. 414-421, 2005.
W.-D. Weber, J. Chou, I. Swarbrick, and D. Wingard, "A qualityofservice mechanism for interconnection networks in system-on-chips," in Date, Munich, Germany, 2005, pp. 1232-1237.
E. Bolotin, I. Cidon, R. Ginosar, and A. Kolodny, "QNoC: QoS architecture and design process for network on chip," J. Syst. Archit., vol. 50, No. 2-3, pp. 105-128, 2004.
L. Zhang, "Virtual Clock: a new traffic control algorithm for packet switching networks," in SIGCOMM, Philadelphia, PA, 1990, pp. 19-29.
K. H. Yum, E. J. Kim, C. R. Das, and A. S. Vaidya, "MediaWorm: a QoS capable router architecture for clusters," IEEE Trans. Parallel Distrib. Syst., vol. 13, No. 12, pp. 1261-1274, 2002.

\* cited by examiner

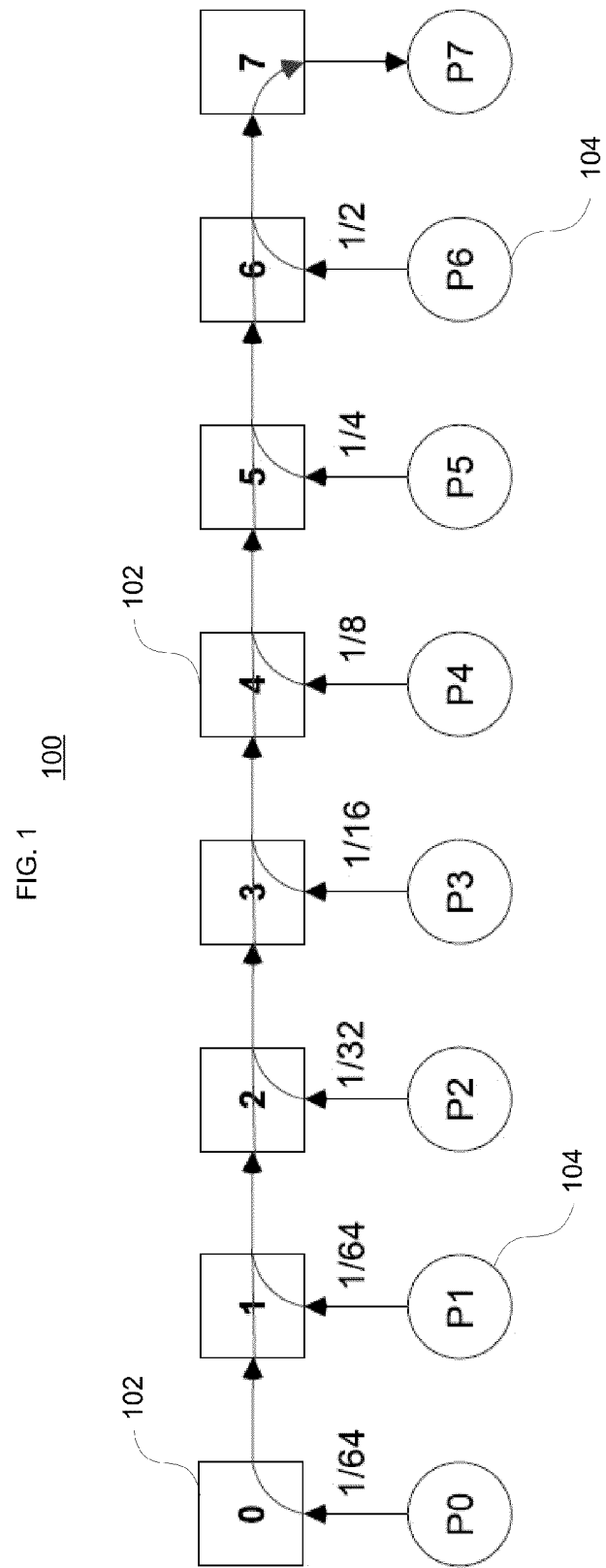

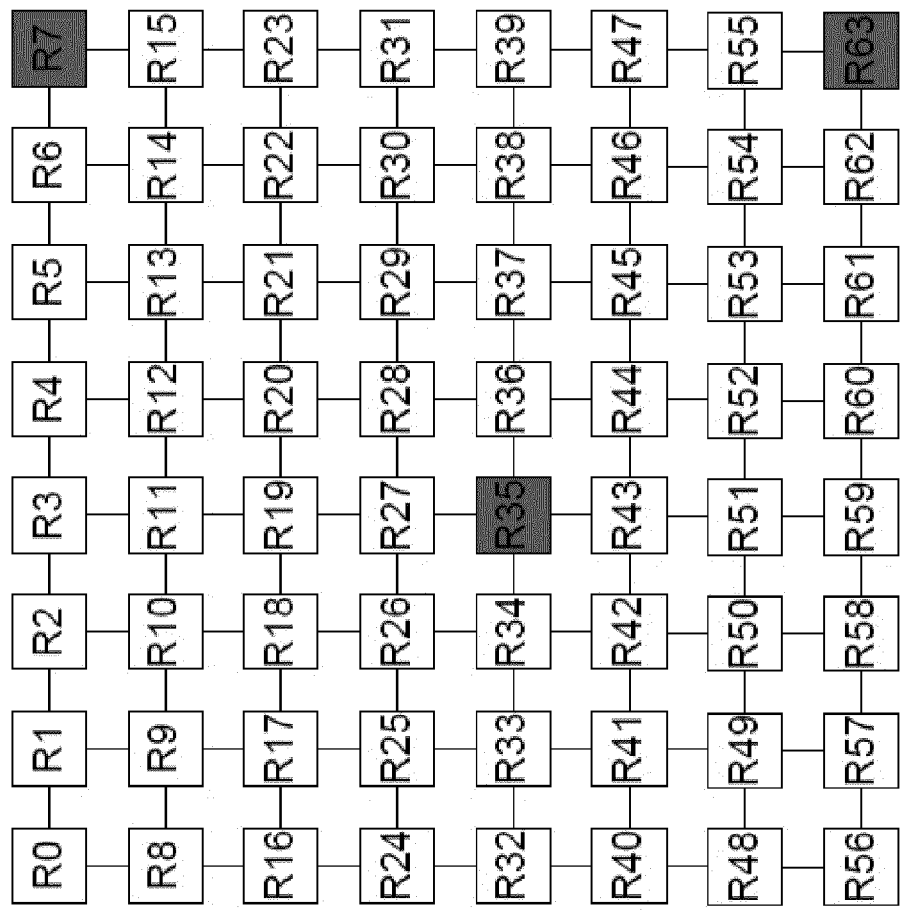
FIG. 3    300

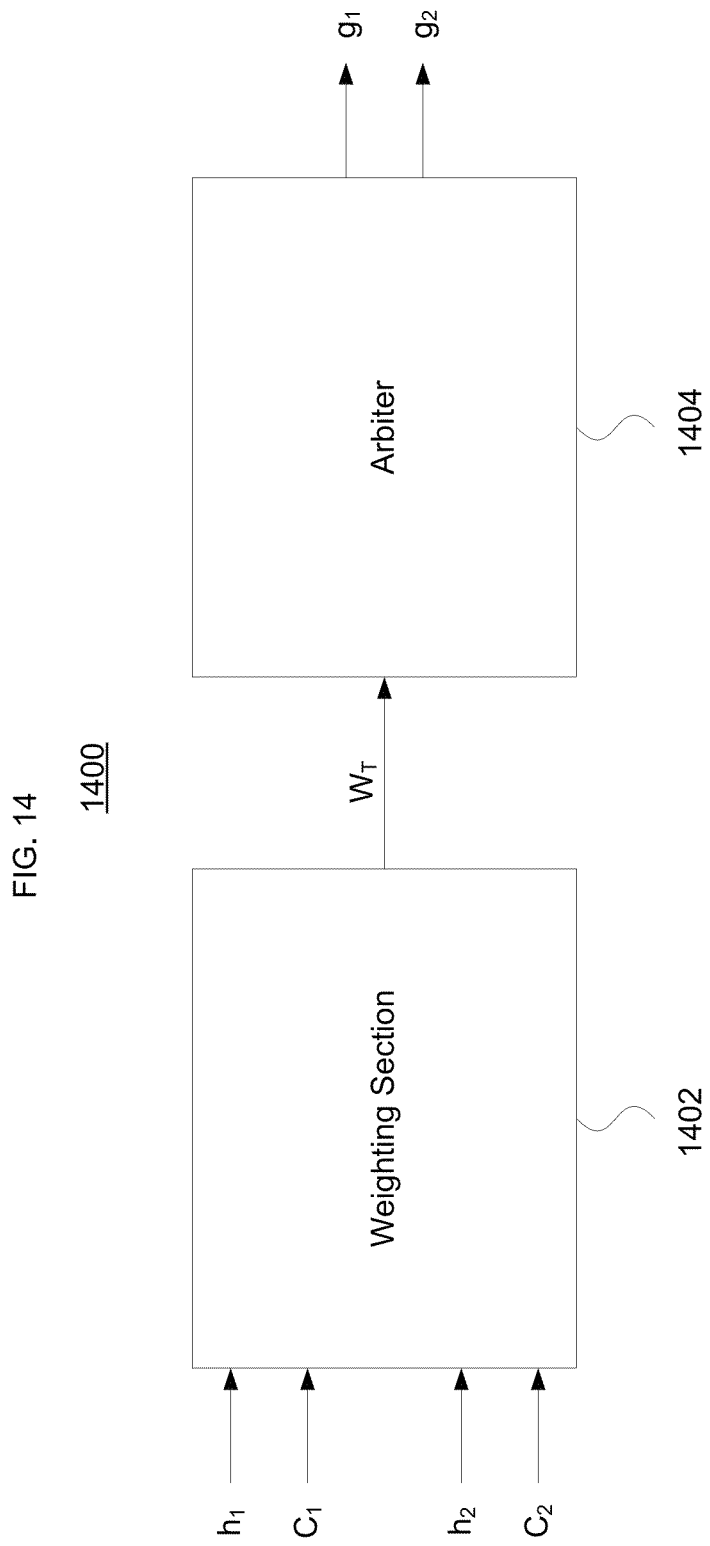

PROBABILISTIC DISTANCE-BASED ARBITRATION

BACKGROUND OF THE INVENTION

1. Field of the Invention

The present invention is generally related to multiprocessor computing devices. More particularly, the present invention is directed to probabilistic arbitration for data packet routing in multiprocessor devices.

2. Description of Related Art

Many-core chip multiprocessors integrate dozens of small processing cores with an on-chip interconnect consisting of point-to-point links. This interconnection enables the processing cores to not only communicate, but to share common resources such as main memory resources and I/O controllers. In particular, accessing memory from shared memory controllers is especially performance sensitive and these types of systems will introduce non-uniformity into memory and I/O access. While systems may implement many cores, they may do so with only a few memory and I/O controllers. This brings new light to old problems of providing equal and fair access to a set of shared resources regardless of where, or which processing core, is scheduled to execute a thread.

In the past, the solution space has been divided into two basic approach classes. The first class of approaches is based on injection rate control. Injection rate control can be placed at either the injection point of each source or the input channel of each intermediate node to limit the maximum number of flits a network or an individual node can service for each flow over a period of time. This time period of bandwidth accounting has been called "frame" in some literature. The second class of approaches proposes sophisticated arbitration techniques to provide equal and fair service. Here, systems have been developed for equal and fair service in long-haul IP networks where large buffers are available. These may achieve fairness and high network utilization, but each router is required to maintain per-flow state and queues that would be impractical in an on-chip network.

SUMMARY OF THE INVENTION

The on-chip network is crucial to providing equal and fair service among the shared resources, in particular providing consistent latency and bandwidth characteristics regardless of the origin or destination of the communication. A goal is to provide bandwidth and latency characteristics that are consistent for all processors on chip. Applications should be insensitive to where, within the on-chip network, the thread is scheduled to execute. Achieving this goal will reduce the variance in the execution time among threads and will provide more efficient synchronization when transitioning between parallel and sequential code regions. For instance, we seek to prevent a core from receiving unfair and unequal bias to a neighboring memory controller resource, compared with a core located further away. Thus, equal and fair service provides equal access to shared network resources regardless of location.

In the near future, emerging many-core chip multiprocessors will likely integrate dozens of small processing cores with on-chip interconnections of point-to-point links. The interconnect facility enables the processing cores to not only communicate, but to share common resources such as main memory resources and I/O controllers. Aspects of the invention provide an arbitration scheme to enable equality of service in access to a chip's shared resources. Bias is removed in a core's access to a shared resource based on its location in a chip multiprocessor ("CMP").

Probabilistic arbitration is combined with distance-based weights to achieve equal and fair service. Nonlinear weights are desirably used with probabilistic arbiters. In particular examples, three different arbitration weight metrics, namely fixed weight, constantly increasing weight, and variably increasing weight are used. By only modifying the arbitration of an on-chip router, additional buffers or virtual channels are not required, creating a simple, low-cost mechanism for achieving equal and fair service. In addition to providing equal and fair service, arbitration according to aspects of the invention has additional benefits which include providing quality-of-service features and providing fairness in terms of both throughput and latency that approaches the global fairness achieved with age-base arbitration—thus, providing a more stable network by achieving high sustained throughput beyond saturation.

In accordance with one embodiment of the invention, a method of routing data packets in an interconnection network is provided. The method comprises receiving a plurality of data packets at a node in the interconnection network and analyzing, with a processor, content of the data packets to determine a source node and a destination node for the data packet. The method also includes performing distance-based arbitration at the node to determine an order for routing the data packets from the node to a next node in the interconnection network. The distance-based arbitration comprises probabilistic arbitration based on weights of different input requests at the node.

According to one aspect, the probabilistic arbitration is based on nonlinear weights of one or more of the input requests for selected ones of the plurality of data packets. The nonlinear weights are associated with distance information regarding the destination node. In one example, the distance information regarding the destination node comprises a hop count identifying a number of hops that separate the source node and the destination node in a given dimension. In this case, the nonlinear weights (w) may be selected using the hop count (h) and a contention degree (C) according to the following equation: $w=C^h$. In one example, the contention degree C is dependent on a location of the destination node in the interconnection network.

Alternatively, the nonlinear weights are fixed weights based on a static value of the hop count. In this case, the interconnection network desirably has a first (x) dimension and a second (y) dimension. Here, the nonlinear weights when traversing the x-dimension are determined according to $w=2^{hx}$, and the nonlinear weights when traversing the y-dimension are determined according to $w=2^{hx} \times C^{hy}$. In one example, the content of the data packets headers remains constant throughout the interconnection network.

According to another aspect of the invention, the nonlinear weights employ constantly increasing dynamic values so that each respective data packet's weight increases as that data packet gets closer to its destination node based on a hop count. And in a further aspect of the invention, the nonlinear weights are based on a variable contention degree.

In accordance with another embodiment, a device is provided. The device comprises a plurality of input ports for receiving data packets from one or more source nodes in an interconnection network and a plurality of output ports for sending the data packets to one or more destination nodes in the interconnection network. The device also includes an arbiter configured to perform distance-based arbitration on the received data packets to determine an order for routing the received data packets to respective subsequent nodes in the interconnection network. The distance-based arbitration comprises probabilistic arbitration based on weights of different input requests for different ones of the received data packets including the given data packet.

In one alternative, the arbiter is configured to perform probabilistic arbitration based on nonlinear weights of one or more of the input requests for selected ones of the received data packets. The nonlinear weights are associated with distance information regarding the destination node for the given data packet. In this case, the distance information regarding the destination node may comprise a hop count identifying a number of hops that separate the source node for the given data packet and the destination node for the given data packet in a given dimension. In one example, the nonlinear weights (w) are selected using the hop count (h) and a contention degree (C) according to the following equation: $w=C^h$. In another example, the nonlinear weights (w) are fixed weights based on a static value of the hop count (h). Here, the interconnection network desirably has a first (x) dimension and a second (y) dimension. In this case, the nonlinear weights when traversing the x-dimension are determined according to $w=2^{hx}$, and the nonlinear weights when traversing the y-dimension are determined according to $w=2^{hx} \times C^{hy}$. And in a further example, the nonlinear weights employ constantly increasing dynamic values so that each respective data packet's weight increases as the that data packet gets closer to its destination node based on the hop count.

In yet another embodiment, a system comprising a plurality of nodes connected to form at least part of an interconnection network is provided. Each node includes a plurality of input ports for receiving data packets from one or more source nodes associated with the interconnection network and a plurality of output ports for sending the data packets to one or more destination nodes associated with the interconnection network. Each node also includes an arbiter configured to perform distance-based arbitration on the received data packets to determine an order for routing the received data packets to respective subsequent nodes in the interconnection network. The distance-based arbitration comprising probabilistic arbitration is based on weights of different input requests for different ones of the received data packets including the given data packet.

In one example, the arbiter is configured to perform probabilistic arbitration based on nonlinear weights of one or more of the input requests for selected ones of the received data packets. Here, the nonlinear weights are associated with distance information regarding the destination node for the given data packet. And in another example, the interconnection network is an on-chip network.

BRIEF DESCRIPTION OF THE DRAWINGS

FIG. 1 illustrates an exemplary mesh interconnection network architecture.

FIG. 3 illustrates an exemplary traffic hotspot situation.

FIG. 14 is a block diagram of an exemplary probabilistic arbiter.

DETAILED DESCRIPTION

Figure 1B:
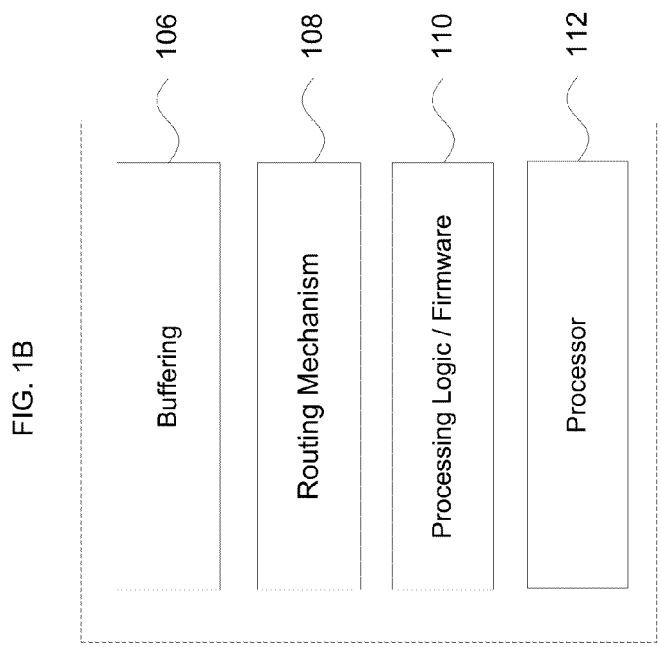
FIGS. 1A-B illustrate a switch architecture that may be used with aspects of the invention.

The aspects, features and advantages of the present invention will be appreciated when considered with reference to the following description of embodiments and accompanying figures. The same reference numbers in different drawings may identify the same or similar elements. Furthermore, the following description does not limit the present invention; rather, the scope of the invention is defined by the appended claims and equivalents.

As discussed herein, an arbitration mechanism is provided to achieve equality of service and predictable performance. Tackling arbitration in the interconnect fabric ensures packets delivered to a shared chip multiprocessor resource are not unfairly biased by source location. However, for on-chip networks, arbitration must be fast and simple to reduce overhead, unlike other quality of service ("QoS") schemes.

Aspects of the invention provide for distance-based arbitration by taking into account the distance or the hop count which a packet travels en route to its destination. This allows nodes located many hops from the edge to get equal service compared to a node close to the edge. According to one aspect, probabilistic arbitration is performed with a distance-based selection algorithm to achieve equal and fair service while providing a low complexity, livelock-free arbitration, which allows for consistent latency and bandwidth characteristics for all processor cores in the interconnect fabric.

Since nodes that are farther away are serviced at a ratio that is geometrically proportional to the hop count, nonlinear weights may be used in probabilistic arbitration to provide fairness to nodes that are farther away. In several examples herein, three different arbitration weight metrics are proposed which all provide equal and fair service but have varying trade-off in terms of complexity and performance degradation on different traffic patterns.

As discussed in more detail below, equal and fair service may be achieved in accordance with the following. Distance-based arbitration is provided as a metric to approximate ages with hop count. To provide fairness using priority-based arbitration with distance as a metric, a distributed probabilistic arbitration may be employed where arbitration decisions are made probabilistically at each router based on the weights of input requests, each input request being for different packets. Another aspect illustrates how nonlinear weights may be used to achieve equal and fair service. Different arbitration weight metrics may be based on the hop count and the degree of contention. It is shown how distance-based, probabilistic arbitration can provide additional benefits which include providing QoS-like characteristics and stronger fairness than conventional round-robin arbitration to enable a more stable network.

There are many different reasons why the claimed invention will be highly beneficial in advanced CMP systems. equal and fair service is crucial to achieve good utilization of hardware resources with multi-threaded programs under non-uniform access time to a critical shared resource since execution time of the slowest thread determines the overall performance. With equal and fair service, the need for topology-aware mapping of threads and tasks reduces as equality of service can be achieved regardless of placement. equal and fair service may be used to address hot-spot traffic that may occur, such as with core-memory traffic where fewer memory controllers are used as compared to cores. Here, hotspot traffic may arise around the memory controllers. Equal and fair service is desirably employed for this traffic as well. In one aspect, probabilistic arbitration using distance-based metrics may provide equal and fair service without the complexity of supporting age-based arbitration.

As traffic flows through the network, it merges with newly injected packets and traffic from other directions in the network. This merging of traffic from different sources causes packets that have further to travel (more hops) to receive geometrically less bandwidth. For example, consider the 8-ary 1-mesh 100 shown in FIG. 1, where processors P0 thru P6 are sending to P7.

Each node of the mesh 100 includes 8 switches (routers) 102, labeled as 0 to 7. Each switch 102 desirably has a processor 104 (P0-P7) connected to it. FIG. 1A illustrates that each switch 102 may comprise a multi-port router. An exemplary 5-port router is shown in this figure, although each router may include more or less ports depending upon the architecture of the mesh 100. In the configuration shown, each switch connects to the switches in adjacent nodes in the mesh 100, and communicates via respective links. Each link desirably includes an input port and an output port.

Figure 1A:
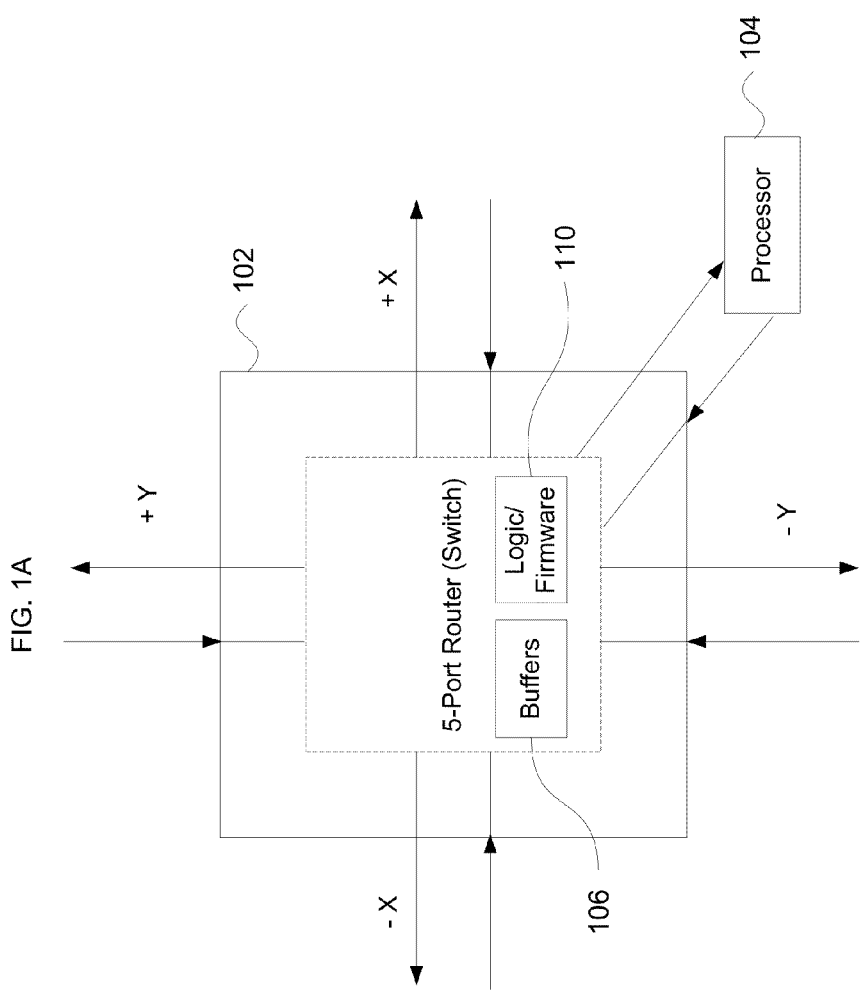

As shown in FIG. 1B, the router (switch) 102 may include buffering (memory) 106 and a routing mechanism 108 for routing data packets to other nodes in the mesh 100. The buffering 106 desirably includes input buffers for received packets and output buffers for packets to be transmitted. Each port, whether input or output, may have a buffer associated with it. The switch 102 desirably also includes processing logic or firmware 110 for determining which path(s) to route packets along.

A processor 112 of the switch 102 preferably manages the processing logic/firmware 110. The processing logic/firmware 110 may include instructions to be executed directly (such as machine code) or indirectly (such as scripts) by the processor 112. For example, the instructions may, be stored as computer code on a computer-readable medium, such as a hard-drive, memory card, flash drive, optical disk, or other type of tangible recording medium/memory device. The terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Returning to FIG. 1, each switch 102 allocates the output port by granting packets fairly among the input ports. In this example, switch 7 and processor P7 are considered the destination. With a round-robin arbitration policy, the processor closest to the destination (here, P6 is only one hop away from P7) will get the most bandwidth –½ of the available bandwidth. The processor two hops away from the destination, P5, will get half of the bandwidth into router R6, for a total of ½×½=¼ of the available bandwidth. That is, every two arbitration cycles P7 will deliver a packet from source P6, and every four arbitration cycles it will deliver a packet from source P5.

As a result, P0 and P1 each receive only 1/64 of the available bandwidth into P7, a factor of 32 times less than that of P6. Reducing the variation in bandwidth is critical for application performance, particularly as applications are scaled to higher processor counts. Although round-robin arbitration provides local fairness at each router, it does not provide any global fairness across all routers. Age-based arbitration is known to provide global fairness as when two or more packets arbitrate for a shared resource, the packet with the oldest age wins the arbitration. However, age-based arbitration may be overly complex or otherwise unfeasible to implement in an on-chip network constraint.

Aspects of the invention avoid the complexity of age-based arbitration by approximating the age of a packet with distance or hop count. By using information already present in the packet, such as source node, current node, or destination node and using distance as a proxy for the packet's age, age-based arbitration is greatly simplified. To understand how hop count can approximate age, the age of a packet corresponds to the latency (T) of a packet from the source node to its destination. Thus:

$$T = T_h + T_s + T_w + T_c$$
$$= H_{tr} + T_s + H_{tw} + H_{tq}$$
$$= H(t_r + t_w + t_q) + T_s,$$

where $T_h$ is header latency, $T_s$ is serialization latency, $T_w$ is wire delay, and $T_c$ is contention and queuing latency.

For all packets, Ts is constant, regardless of the total latency and is only dependent on the channel bandwidth and packet size. For all other parameters, they are directly proportional to the total hop count (H) from source to destination and other parameters such as per-hop router latency ($t_r$), per-hop wire delay ($t_w$), and per-hop queuing delay ($t_q$). In the case of a 2D mesh topology, all $t_w$ are identical. $T_c$ may be approximated with $H_{tq}$ as there is an assumption that per-hop queuing latency dominates the contention latency. In view of this, the age of a packet may be viewed as being directly proportional to the hop count (H), and may be used to approximate the packet's age. In order to use hop count as a useful arbitration metric, fairness should be guaranteed, because by providing preference based on weights, there is potential for livelock and starvation. In livelock, it is possible to make local progress but not make global progress toward a destination. For example, considering a roadway having a roundabout or rotary, one may make local progress around the roundabout, but not leave the roundabout and move toward the destination. Starvation is the undesirable property that a request will never receive a grant, so that the request will end up waiting for a resource indefinitely.

Known arbitration architectures are deterministic. In other words, given a set of input requests and the switch's current state, such as a state of the arbitration pointer or priorities, the output grants are always deterministically assigned. For sorted priority-based arbitration such as age-based arbitration, arbitration is done deterministically based on the relative age of the requests. Starvation is inherently not a problem with age-based arbitration. But by using priority based on hop count, livelock and fairness issues are problematic because packets with a lower priority (i.e., a lower hop count) can continually lose arbitration because of a constant stream of newly injected traffic with higher priority.

Figure 2:
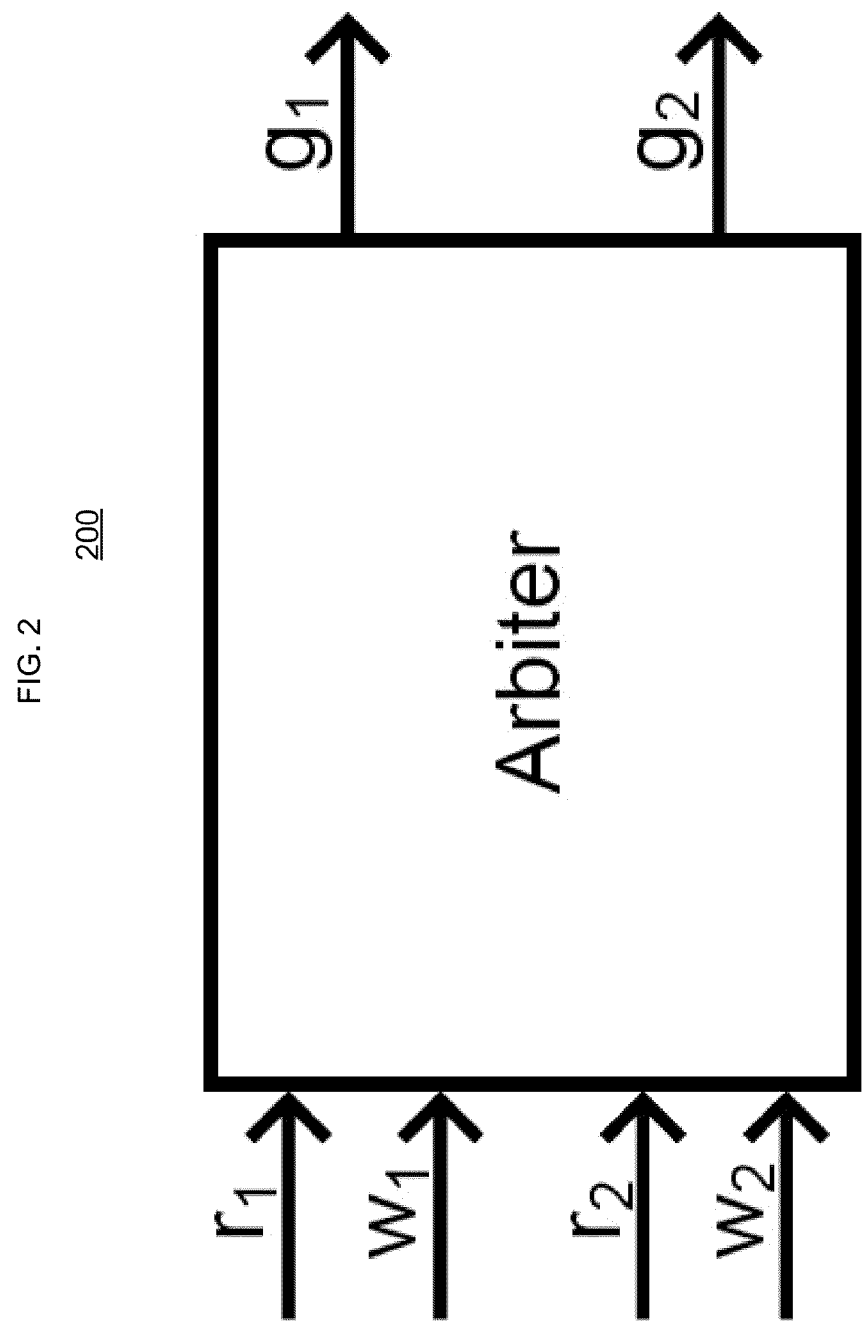
FIG. 2 illustrates an arbiter according to aspects of the invention.

To overcome this problem while still using hop count as the weight, aspects of the invention employ probabilistic arbitration where the output of the arbitration is probabilistically determined based on the weight of the input requests. The probabilistic arbitration may be performed by an arbiter, which may include the processor 112 executing the processing logic/firmware 110 of FIG. 1B. For instance, assume an arbiter 200 shown in FIG. 2 with two request $r_1$ and $r_2$, each with a corresponding weight $w_1$ and $w_2$. The probability (P) of each grant $g_1$ and $g_2$ being asserted with probabilistic arbitration is equal to the following:

$$P(g_1) = \frac{w_1}{w_1 + w_2}$$

$$P(g_2) = \frac{w_2}{w_1 + w_2}$$

Since both grants cannot be asserted in the same cycle, the arbiter needs to probabilistically select one of the two requests based on this probability. In one aspect, if the incoming weights are identical (i.e., $w_1 = w_2$), the arbiter behaves like a random arbiter and randomly selects one of the two requests. In general, for a request $r_i$ into an arbiter with m requests, the probability of $r_i$ being granted is:

$$P(g_i) = \frac{w_i}{\sum_{j=1}^{j=m} w_j}$$

A request in probabilistic arbitration will not starve indefinitely, since with a probability of 1, it will be granted regardless of the weight. However a request can incur significant wait time if it continuously loses arbitration.

Figure 4A:
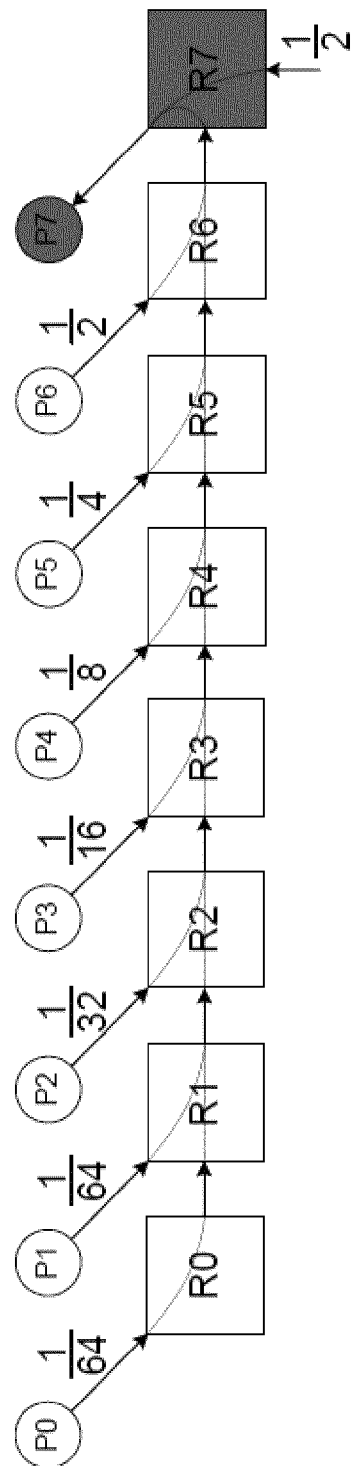
FIGS. 4A-C illustrate merging and hotspot traffic in a 2D mesh interconnection network.
Figure 4B:
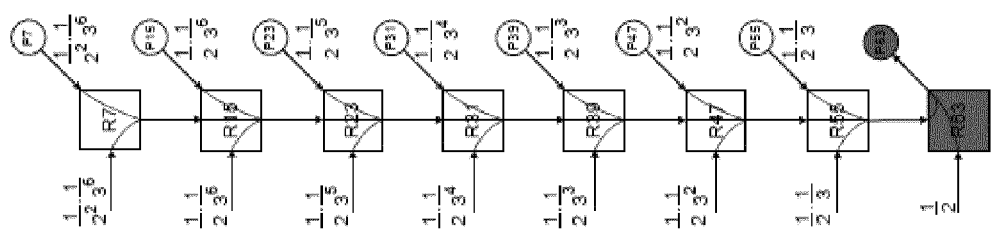
Figure 4C:
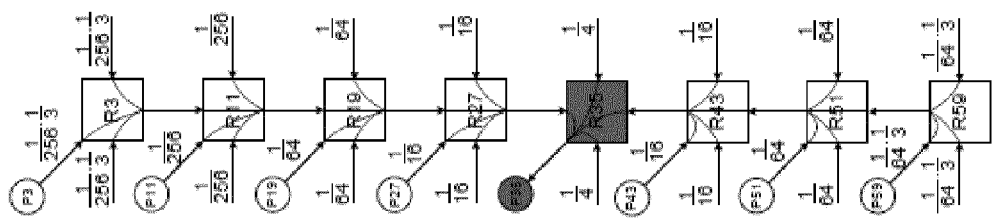

FIG. 3 illustrates a traffic hotspot situation. In particular, this figure shows an exemplary 8×8, two-dimensional mesh 300. Several hotspots are highlighted, namely at routers (switches) R7, R35 and R63. FIGS. 4A-C illustrate merging of traffic in this situation. The fractional numbers in each figure represent the amount of bandwidth that the corresponding nodes would receive if a locally fair, round robin arbitration is implemented.

The hop count can be implemented as linear weights in probabilistic arbiter. In other words, $w=h_x$ or $w=h_x+h_y$, where $h_x$ and $h_y$ represent the hop count from source to destination in each dimension. However, probabilistic arbitration using linear weight hop count cannot provide equal and fair service since farther nodes will be serviced linearly instead of geometrically. The weight inputs to the probabilistic arbiter will only differ linearly and not be able to provide equal and fair service to farther nodes.

For example, for two packets that are separated by x hop count, the linear weights for the two packets will be w and w−x, assuming both packets have the same destination. The probability of each packet winning an arbitration is $$\frac{w}{2w-x}$$

and $$\frac{w-x}{2w-x},$$

respectively. For large values of w (w>>x) or for small values of x, the probability of each packet winning the arbitration is approximately ½. Thus, the result of probabilistic arbitration with linear weight is very similar to round-robin arbitration. As such, a linear weight solution may have the same shortcomings as with round robin arbitration.

Figure 5A:
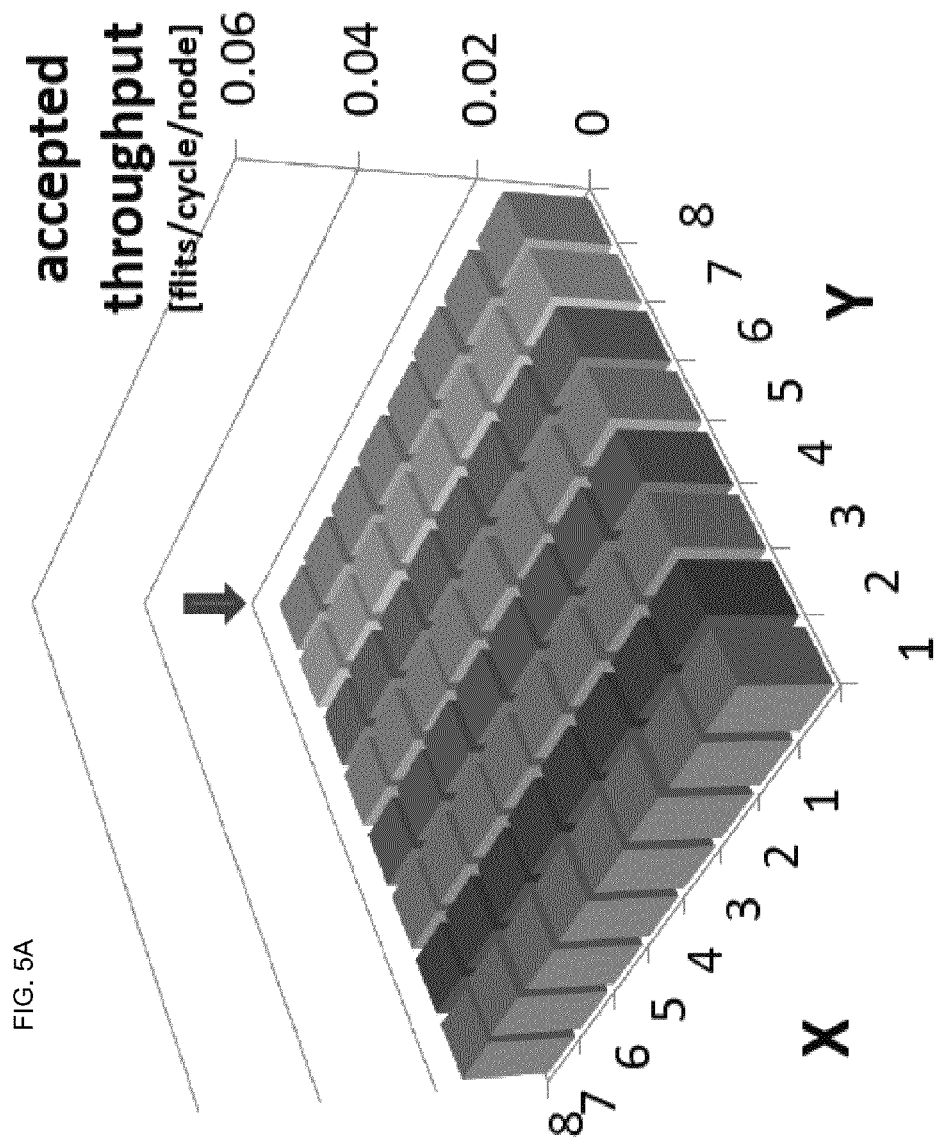
FIGS. 5A-D compare throughput per source node for different arbitration systems.
Figure 5B:
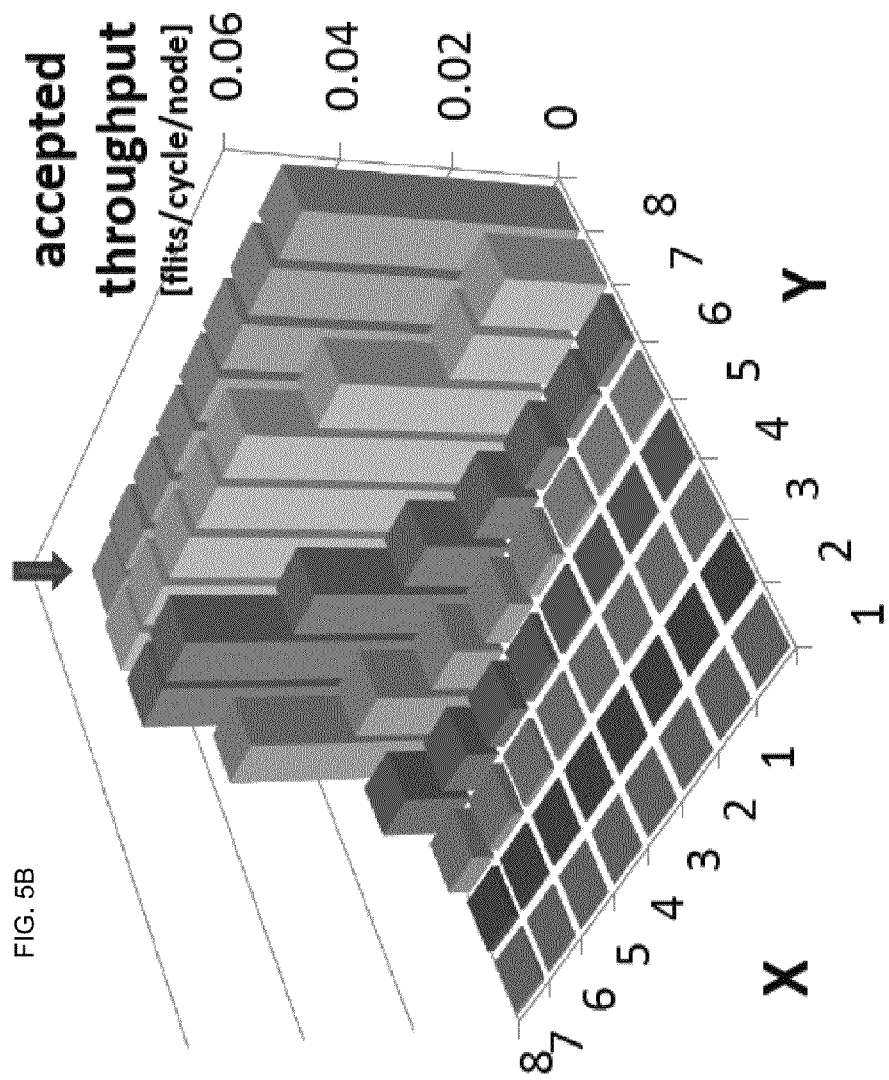
Figure 5C:
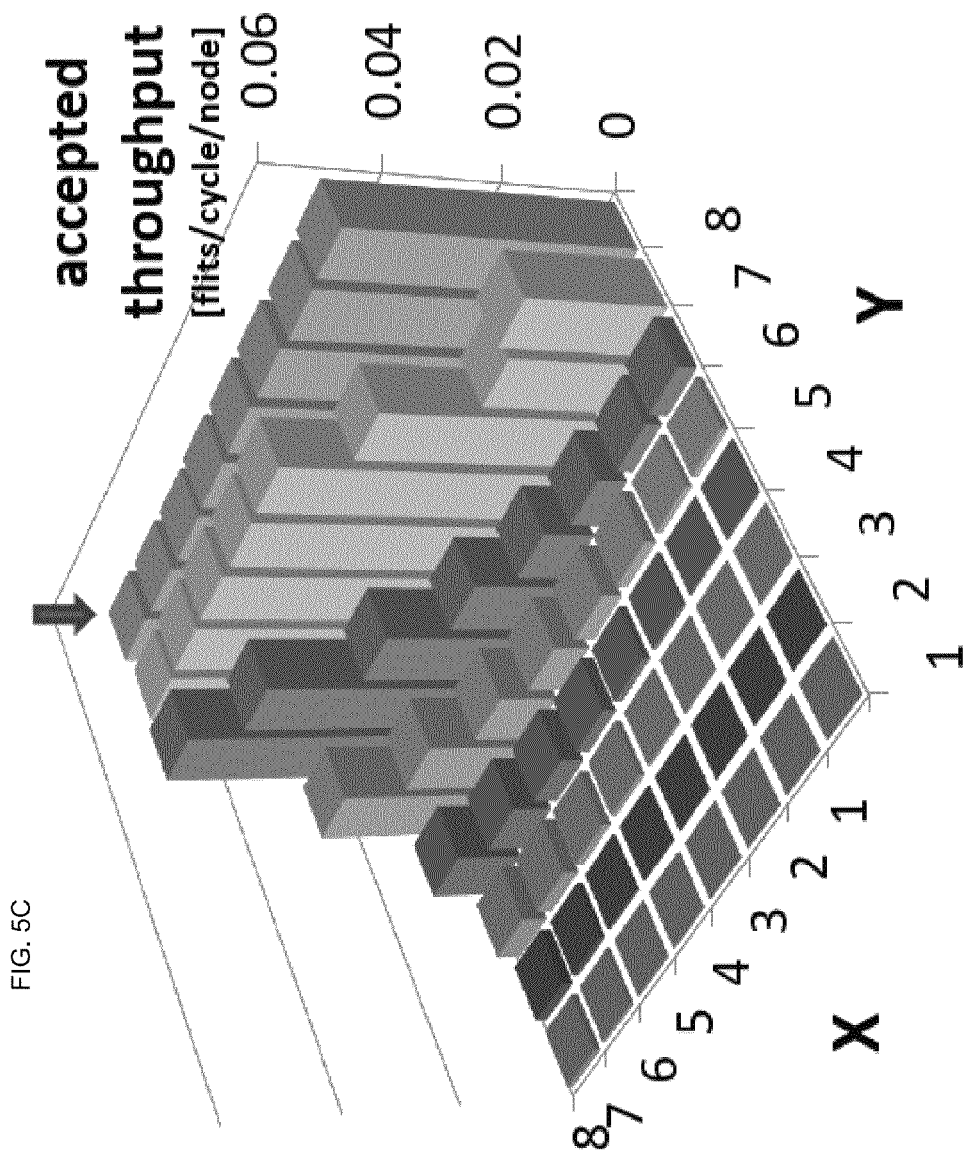
Figure 5D:
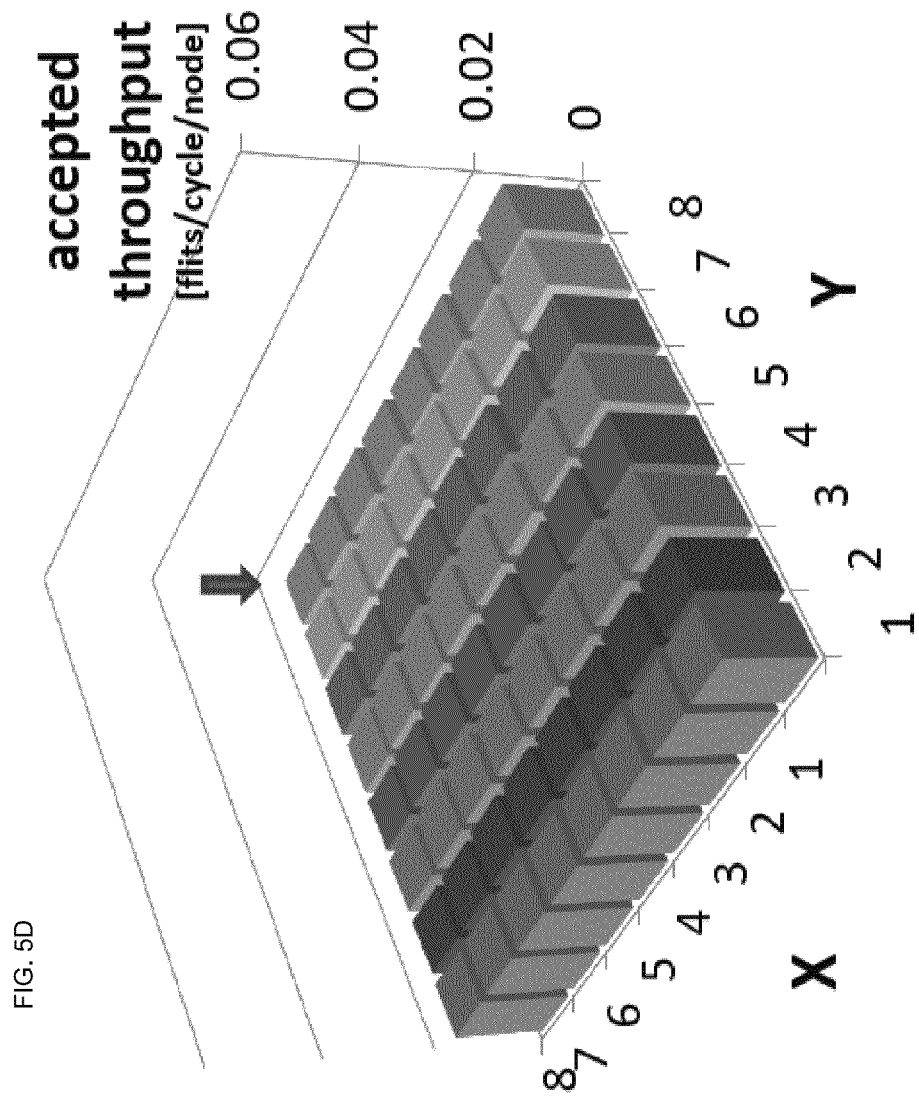

FIGS. 5A-D illustrate examples of accepted throughput per source node by a hotspot resource, which is indicated by the downward arrow in each figure. FIG. 5A represents age-based arbitration, FIG. 5B represents round-robin arbitration, FIG. 5C represents arbitration with linear weights. And FIG. 5D represents probabilistic arbitration with non-linear weights.

FIG. 5C shows that the result of probabilistic arbitration with linear weight is very similar to round-robin arbitration for hotspot traffic, where all traffic is sent to a single node. However, the resulting acceptance rate of each node in FIG. 5C does not provide the equality of service as shown in FIG. 5A with an ideal age-based arbitration. In contrast, the non-linear weighted probabilistic arbitration shown in FIG. 5D does provide approximately the same equal and fair service as age based arbitration shown in FIG. 5A.

As discussed above with regard to FIG. 1, nodes that are farther away are serviced at a rate that is exponentially proportional to the hop count. For example, packets that are h hops away are serviced at a rate of $(½)^h$, and the service rate is not linearly proportional to the hop count. To account for this difference, nonlinear weights are introduced based on the distance. Instead of using a weight which is equal to the hop count (i.e., w=h), one aspect employs nonlinear weights in probabilistic arbitration. Thus, $w=C^h$, where C is the contention degree or the number of packets contending for the same output port.

By using nonlinear weights, fairer treatment is provided for nodes that are farther away. For example, as shown in FIG. 4A, if nodes are serviced at a rate of ½, ¼, ⅛, ⅙, . . . , in order to provide equal and fair service, each node needs to be prioritized with a weight of 2, 4, 8, 16, . . . , respectively. Thus, for the traffic pattern shown in FIG. 4A, $w=2^h$ can be used with probabilistic arbitration to achieve equal and fair service. C=2 is used, because for each output there are two flows contending for a router output. With XY routing, packets traveling in the x-dimension will merge similar to the traffic shown in FIG. 4A.

For hotspot traffic shown in FIG. 4B, when traversing the y-dimension, there are 3 traffic flows merging at each router, resulting in each flow being serviced at a rate of ⅓. Thus, the weight used for the y-dimension is $w=3^h$. For traffic shown in FIG. 4C, where the destination node is located in the non-edge location of a 2D mesh network, the number of flows merging is 4, thus $w=4^h$ is used to provide fairness across all nodes.

To better understand certain design tradeoffs, several metrics are defined that can be used as an input to probabilistic arbitration. The hop count weight used can be categorized as either static or dynamic. With a static arbitration metric, the priority of the packet is known beforehand at the time the packet is injected into the fabric. On the other hand, dynamic metrics will cause the priority of a packet to change en route. Leveraging the nonlinear weight ($C^h$), the different metric can be categorized based on whether C and h are either static or dynamic as summarized in Table I.

TABLE I

Arbitration metrics to determine weight of probabilistic arbitration

| h | C | description |
|---|---|---|
| static | static | fixed weight (FW) |
| dynamic | static | constantly increasing weight (CW) |
| static | dynamic | N/A |
| dynamic | dynamic | variably increasing weight (VW) |

In describing the different metrics, it is assumed that a packet is sent from a source node located at $(s_x, s_y)$ to a destination at $(d_x, d_y)$ and the current location is $(c_x, c_y)$. Dimension-ordered routing ("DOR") with XY routing is also assumed.

For the fixed weight ("FW") scenario shown in Table I, the total number of hops a packet must travel from its source to its destination is a static value in a mesh network with minimal routing (e.g., dimension-ordered routing). This value is known when the packet is injected into the network. Using this distance, packets which have a longer distance to travel are biased by giving them higher priority at each hop along the way. The static value of the hop count is used based on the source and destination node.

$$h_x = |s_x - d_x|$$

$$h_y = |s_y - d_y|$$

Using these hop counts, the weight is calculated according to the dimension being traversed with a contention degree C. While traversing in the x-dimension, $w = 2^{h_x}$ is used, and when traversing in the y-dimension, $w = 2^{h_x} \times C^{h_y}$ is used. When traveling in the y-dimension, the weight from the x-dimension is included as well to properly prioritize packets that have traversed longer overall distance. However, the y-dimension weight $C^{h_y}$ is not included while traversing the x-dimension, because when a packet only needs to traverse the x-dimension, a packet that needs to traverse both the x and the y-dimension will be unfairly biased. With this metric, the weight of each packet remains constant or fixed throughout the network. The value of C is dependent on the location of the destination. For a radix-k 2D mesh topology (i.e., k×k mesh):

$$C = \begin{cases} 3 & d_x = 0 \| d_x = k-1 \\ 4 & \text{otherwise.} \end{cases}$$

Since 2D mesh is a non-edge symmetric topology, for destination located on the edge of the 2D mesh network, C=3 while C=4 is used for all other destination.

For the constantly increasing weight ("CW") scenario shown in Table I, instead of relying on static values, another metric for arbitration uses dynamic values based on how much distance a packet has traversed. The distance traveled arbitration metric is defined as the number of hops from the current position to the packet source. A packet's weight increases as it gets closer to its destination. The dynamic value of the hop count is obtained from the following.

$$h_x = |c_x - s_x|$$

$$b_y = |c_y - s_y| \quad (1)$$

Similar to the FW metric, when traveling in the x-dimension, the weight here is $2^{h_x}$ calculated based on the distance traveled (Equation (1)). And when traveling in the y-dimension, $2^{h_x} \times C^{h_y}$ is used where C is based on the destination location as described earlier. When the packet reaches the destination, the weight will be identical to the weight using FW. Another way to view this metric is to assume that when a packet is injected, it is assigned a weight of 1. As a packet traverses the network, the weight is continually increased. In the x-direction, the weight is multiplied by a factor of 2 at each hop. And when traveling in the y-dimension, the weight is multiplied by a factor of C at each hop.

For the variably increasing weight ("VW") scenario shown in Table I, instead of a assuming a constant C value at each hop in each dimension, a metric is evaluated where the value of C per hop is variably changed. Packets are injected with a priority of 1 and the priority also increases dynamically as the packet traverse the network to its destination, similar to CW. However, the increase in weight is not constant as in CW but is dynamic based on the actual contention degree (C) for the output port. The contention degree is defined as the number of packets that are destined for the same router output port. The range of values for C is $1 \leq C \leq (p-1)$, where p is the number of router ports. It is assumed that there is no U-turn routing, and thus the maximum value of C is p–1. For example, if there are 3 packets that need to be routed through one output port of a router, each of these packets will have a contention degree of 3. Thus, when these packets are forwarded to the next router, their priorities are increased by 3×. However, if there are no other packets contending for the same output in a given cycle, the weight of the packet remains constant and does not change.

As shown earlier in Table I, another possible weight metric is using static hop count and dynamic contention degree. However, this metric is not applicable, because if the hop count is static or determined from the source, the entire weight needs to be fixed at the source. Otherwise, the weight would increase by Ch per hop and will not provide equal and fair service as significantly more priority is provided to nodes that are farther away.

In addition, the dynamic hop count can be obtained from the distance or hop count remaining, which is the number of hops to the destination from its current location in the network. This metric would decrease the packet's priority as it approaches the destination. However, decreasing the weight can negate the effect of using probabilistic arbitration. For example, in FIG. 4A, if each packet begins with a fixed weight at its source and if the packet's weights were decreased by C=2 at each hop, the packets that are merged at each router will have equal weights. This would result in arbitration very similar to round-robin arbitration and would not be able to provide any equal and fair service.

Distance-based probabilistic arbitration is evaluated using a cycle-accurate interconnection network simulator. In one example to evaluate the latency-throughput, the simulator is warmed up under load without taking measurements until steady-state is reached. Then, a sample of injected packets is labeled during a measurement interval. The simulation is run until all labeled packets exit the system. Such simulations have been run using different synthetic traffic patterns including hotspot traffic, uniform random, bit complement, bit reverse, shuffle, tornado, random permutation, and transpose were used to evaluate probabilistic arbitration. Selected results are presented in detail below. Parameters used in the synthetic simulations are described in Table II.

TABLE II

Synthetic Traffic Simulation Parameters

| Parameters | Values |
| --- | --- |
| network size | 64 |
| topology | 2D mesh |
| routing | XY routing |
| router latency | 3 cycle |
| buffers | 16 flit entry per input port |
| virtual channels | 1 |
| packet size | bimodal(50% 1 flit and 50% 4 flits) |

Distance-based, probabilistic arbitration does not require additional virtual channels ("VCs"), so a single VC was used in the traffic simulations. A FIFO buffer structure was assumed, where packet reordering is not allowed at each router input buffer. If additional VCs are required for protocol deadlock, probabilistic arbitration can support additional VCs for different classes of traffic as long as packets stay within the same VCs from source to its destination. The only change required is that VC allocation needs to implement probabilistic arbitration based on distance as well. For the long packets, the head flit goes through switch arbitration using probabilistic arbitration.

The following different arbitration algorithms are compared in the evaluation: round-robin arbitration ("RR"), age-based arbitration ("AGE"), and probabilistic arbitration, which includes fixed weight (FW), constantly increasing weight (CW) and variably increasing weight (VW). Evaluations are performed on benign (uniform random) and adversarial traffic such as "hot spot" traffic that would be common in a chip multiprocessor.

First, probabilistic arbitration on hotspot traffic is evaluated, where all nodes send traffic to a single destination. Achieving equality of service is verified by measuring the accepted throughput across all nodes. The different metrics (FW, CW, VW) all provide very similar results, so only the result for CW is shown in FIG. 5D. As a result, by approximating age with hop count and using nonlinear weight with probabilistic arbitration, one can match the performance of age-based arbitration in hotspot traffic and achieve equality of service. Latency variation is also an important factor in determining overall performance. Thus, minimizing the variance is also critical in providing equal and fair service. Table III measures the packet latency variation in hotspot traffic.

TABLE III

Packet Latency Variation

| | mean(cycles) | max(cycles) | std dev |
| --- | --- | --- | --- |
| RR | 739 | 3153 | 1026 |
| AGE | 62.93 | 63 | 0.088 |
| VW | 62.93 | 66.2 | 1.20 |
| CW | 62.96 | 68.8 | 1.96 |
| FW | 62.92 | 65.5 | 1.95 |

The packet latency variation is calculated using the latency difference for consecutive packets within one flow, where a flow is defined as the traffic from a source to the hotspot destination. Age-based arbitration provides the tightest distribution with the lowest variance ("std dev"), but all three arbitration weight metrics (VW, CW and FW) also achieve a very tight distribution with slightly higher variance while the average values are nearly identical. However, locally fair round-robin arbitration not only has a higher mean value but also has a significantly higher variation.

Figure 6A:
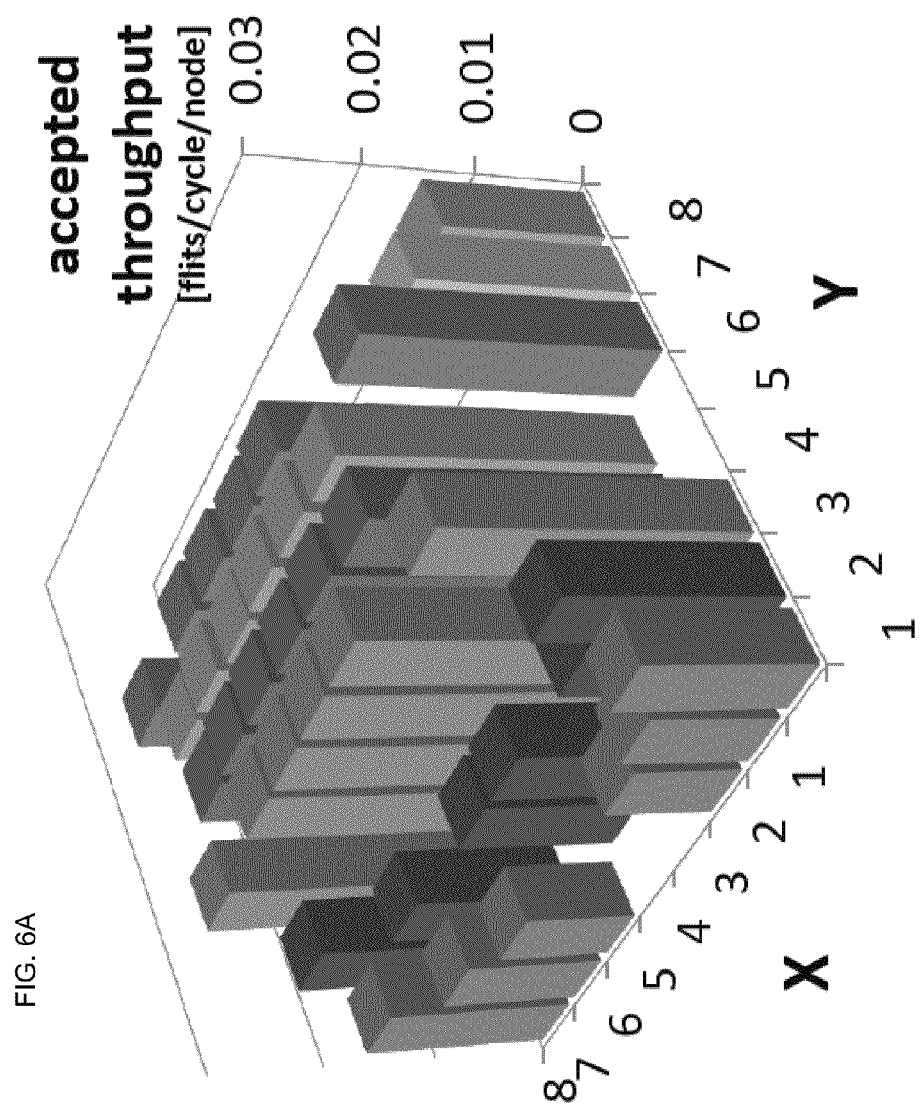
FIGS. 6A-C plot accepted throughput across multiple hotspots for round-robin, age-based and probabilistic arbitration.
Figure 6B:
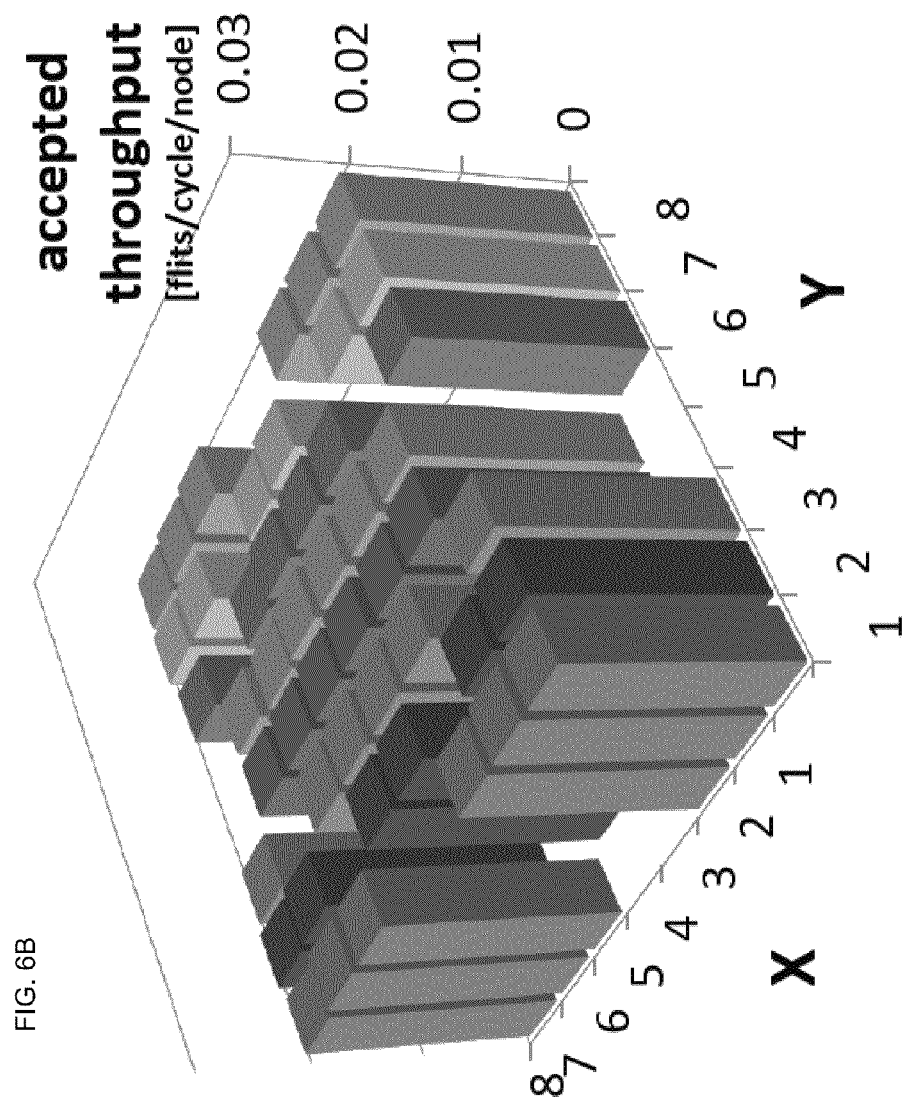
Figure 6C:
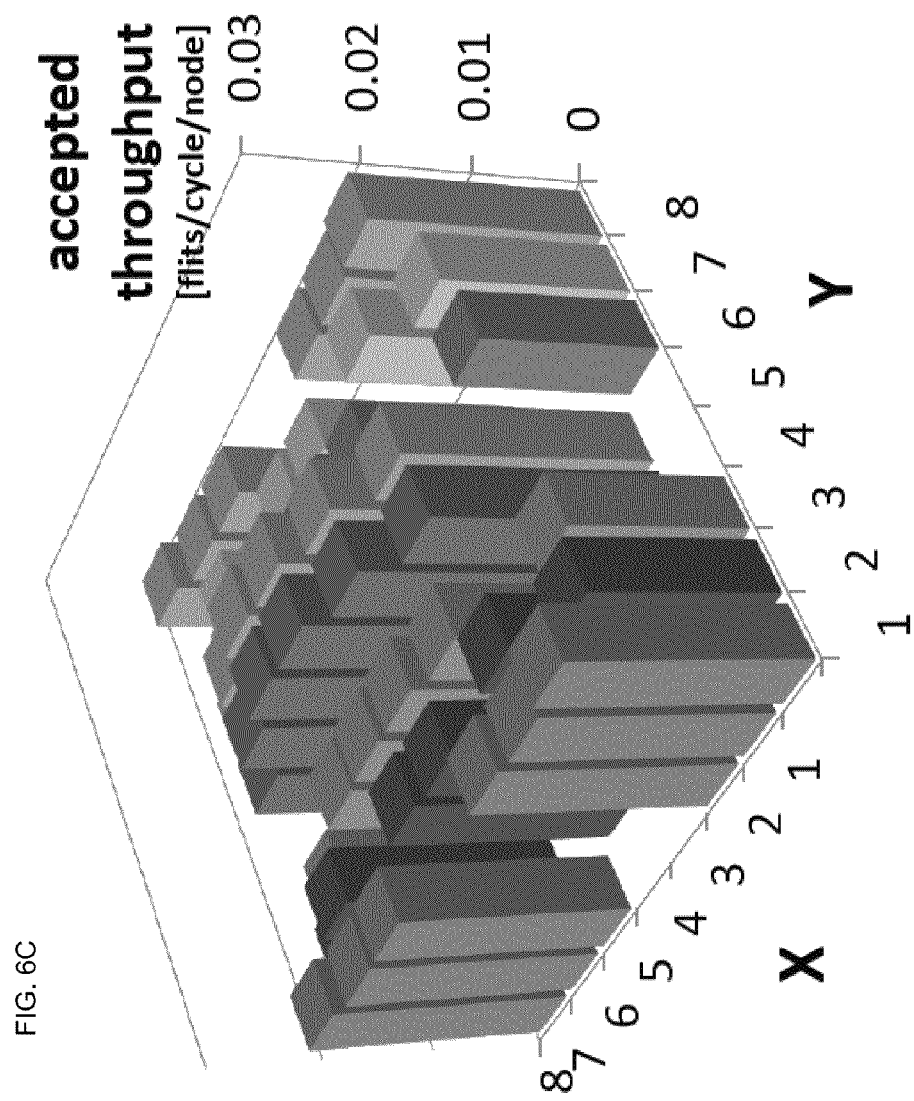

Next, probabilistic arbitration is evaluated with multiple hotspot traffic (such as the traffic to memory controller) in future many-core processors. A diamond placement of memory controllers was evaluated using 16 memory controllers. A uniform random distribution to 1 of 16 memory controllers was assumed. FIGS. 6A-C plot the accepted throughput of all the nodes that send traffic to the memory controllers. The 16 nodes with zero accepted throughput are the location of the memory controllers.

As shown in FIG. 6A, although the diamond placement was shown to provide good performance for on-chip network memory traffic, if round-robin arbitration is used, unfairness is created in reaching the distributed number of memory controllers. Thus, nodes in the middle of the chip are able to send more traffic than the nodes in the corners. As shown in FIG. 6B, age-based arbitration is able to provide a global fairness and achieve the same throughput for all nodes. Using probabilistic arbitration as shown in FIG. 6C, the system is able to significantly reduce the unfairness compared to round-robin arbitration.

Figure 7A:
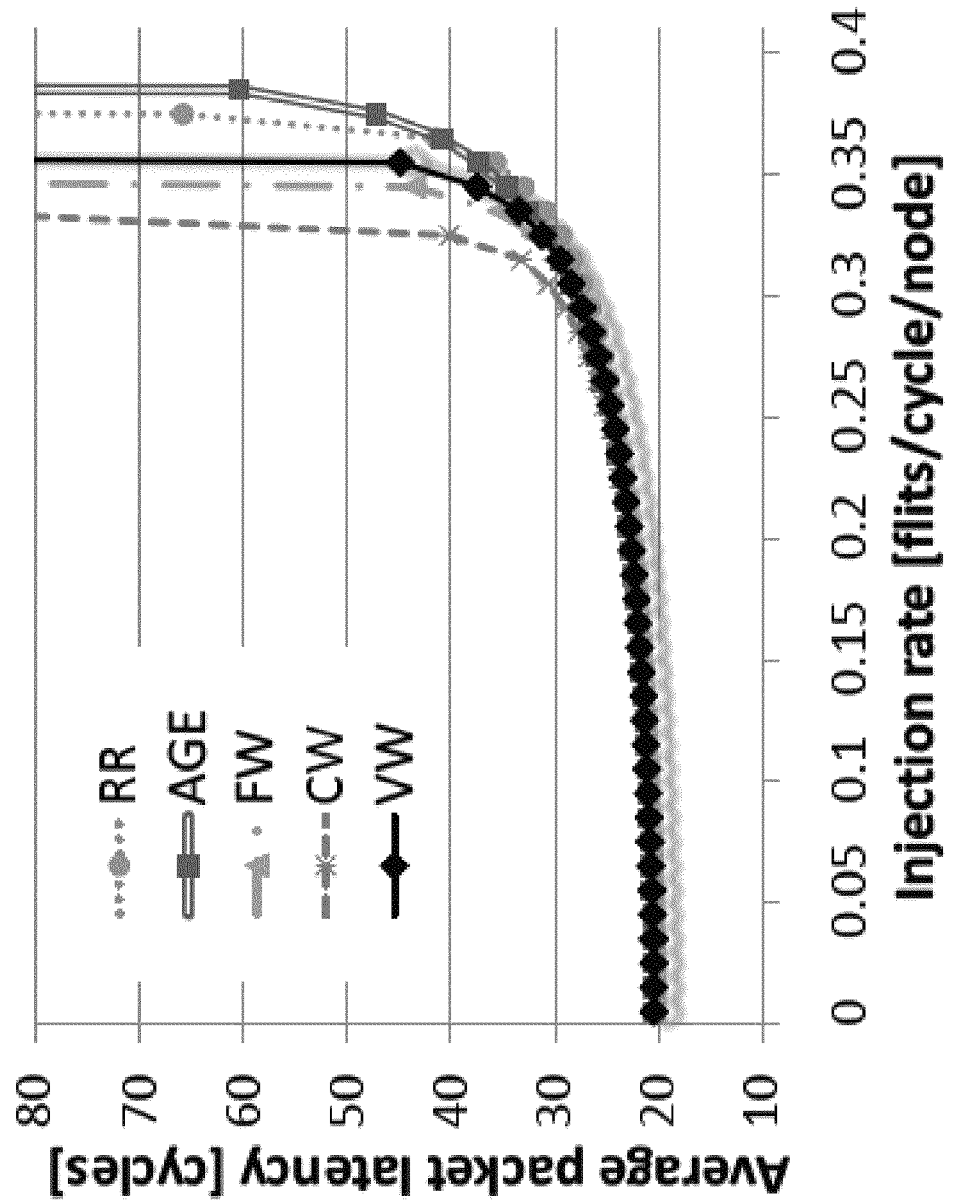
FIGS. 7A-C illustrate latency throughput curves for different traffic patterns.
Figure 7B:
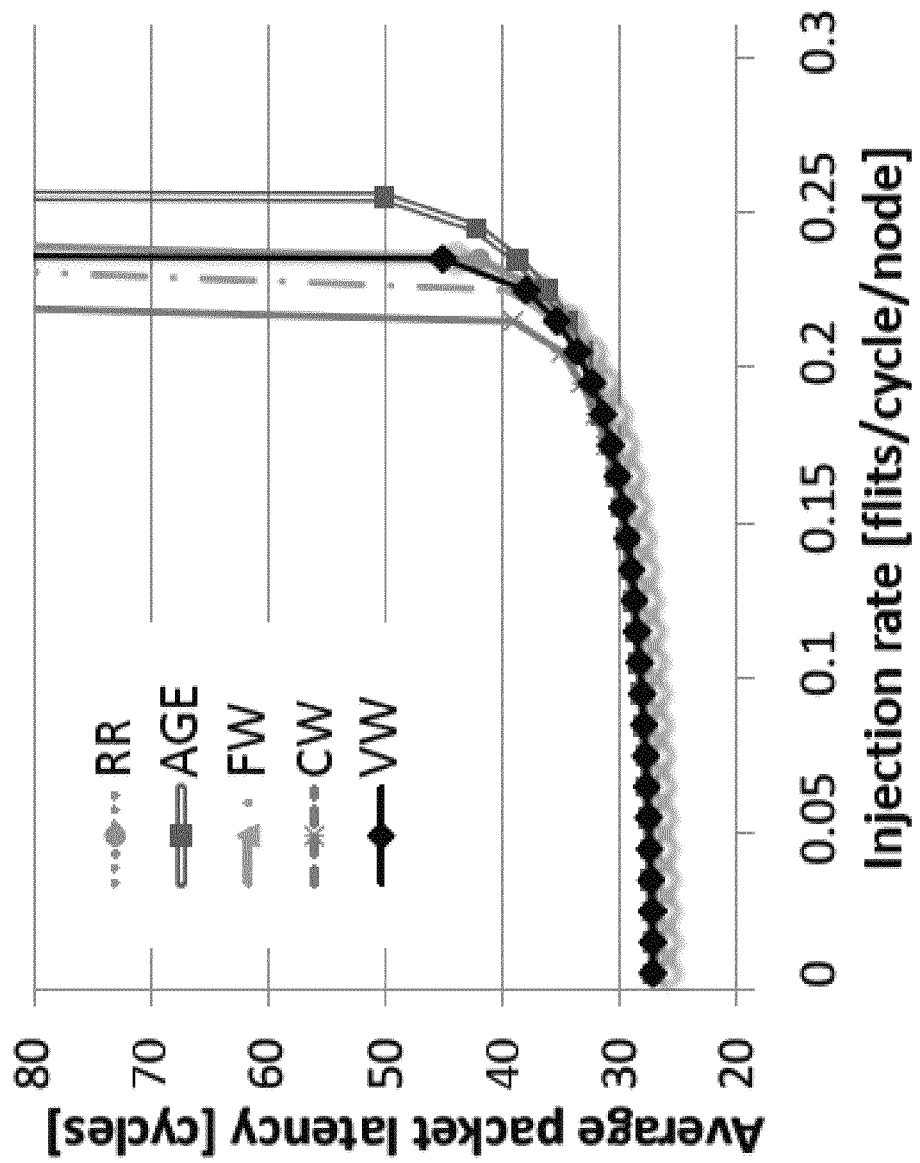
Figure 7C:
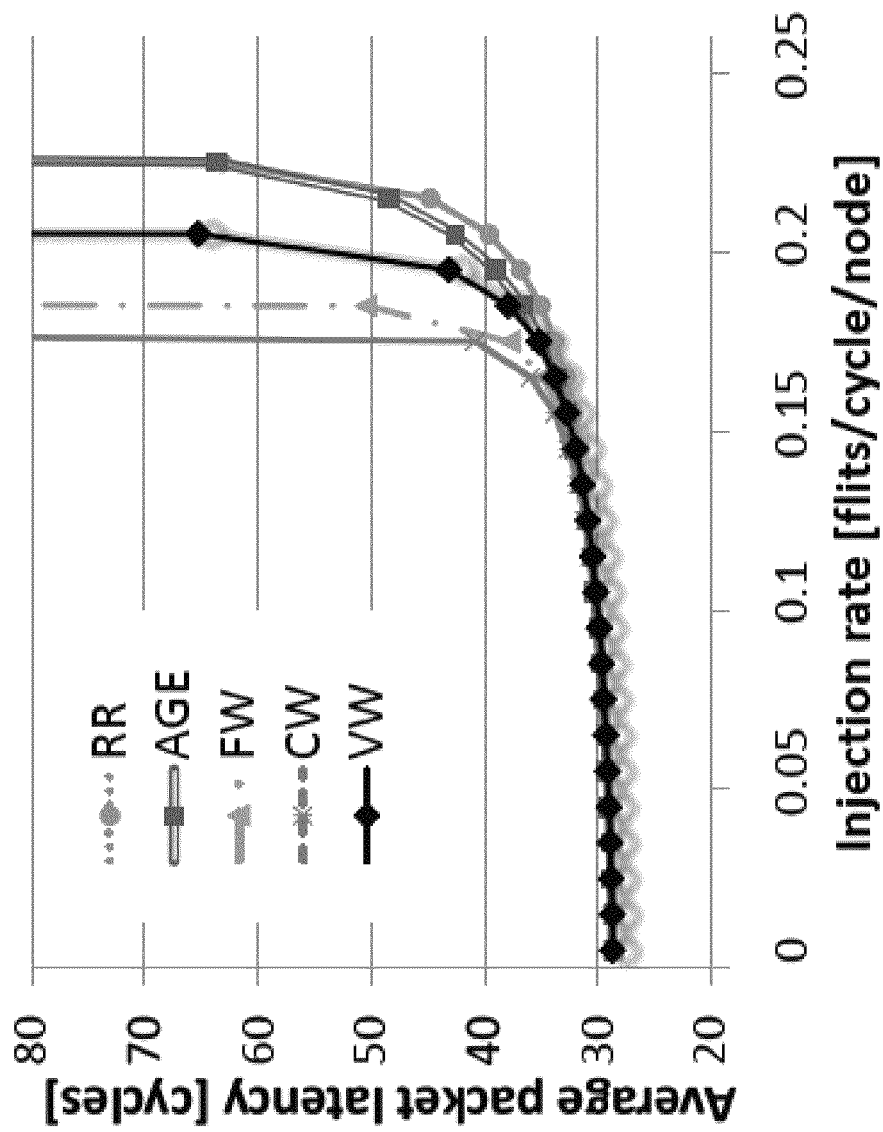

Next, the impact of probabilistic arbitration on the performance of different synthetic traffic patterns is considered, and its impact on performance is evaluated. The latency vs. throughput curve for different traffic patterns are shown in FIGS. 7A-C. In particular, FIG. 7A illustrates a uniform random traffic pattern, FIG. 7B illustrates a tornado traffic pattern, and FIG. 7C illustrates a bitcomp traffic pattern.

As only the switch arbitration is modified, the zero-load latencies of the different arbitration are all identical for a given traffic pattern. For some traffic patterns such as bitrev (not shown), all of the different arbitration mechanism achieve nearly identical latency vs. throughput curves. However, for other traffic patterns, the different weight metrics with probabilistic arbitration result in different throughput. For example, with uniform random traffic, CW reduces the saturation throughput by approximately 13% compared to RR while VW and FW provide better performance than CW. For the tornado traffic pattern, VW approximately matches the throughput of RR—thus, the ability of providing equal and fair service has minimal impact of performance. Across all traffic patterns, VW generally provides the highest performance compared to FW or CW because of its ability to adapt to the contention by calculating the contention degree at each router before increasing the weight.

Figure 8A:
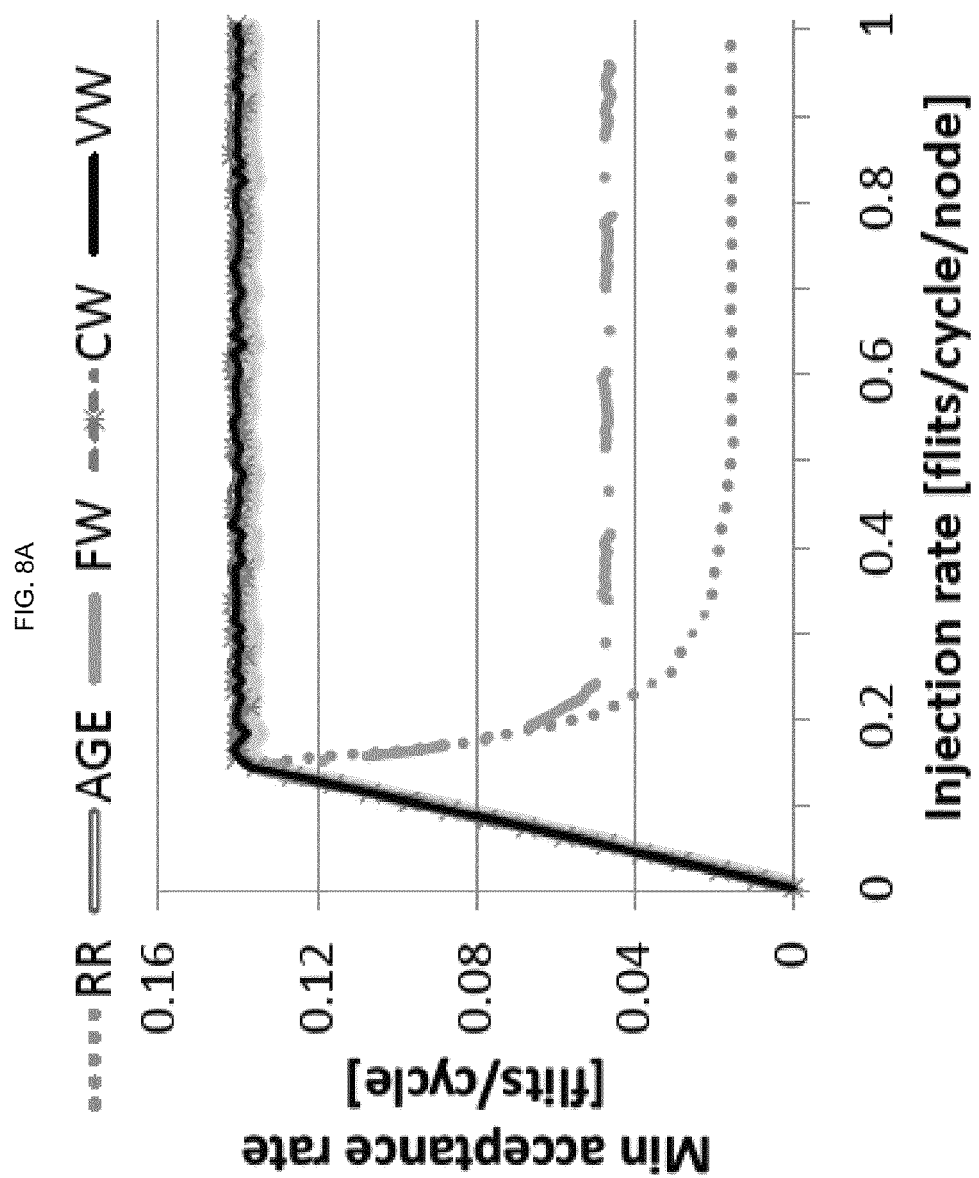
FIGS. 8A-C plot offered load versus minimum accepted throughput for different traffic patterns.
Figure 8B:
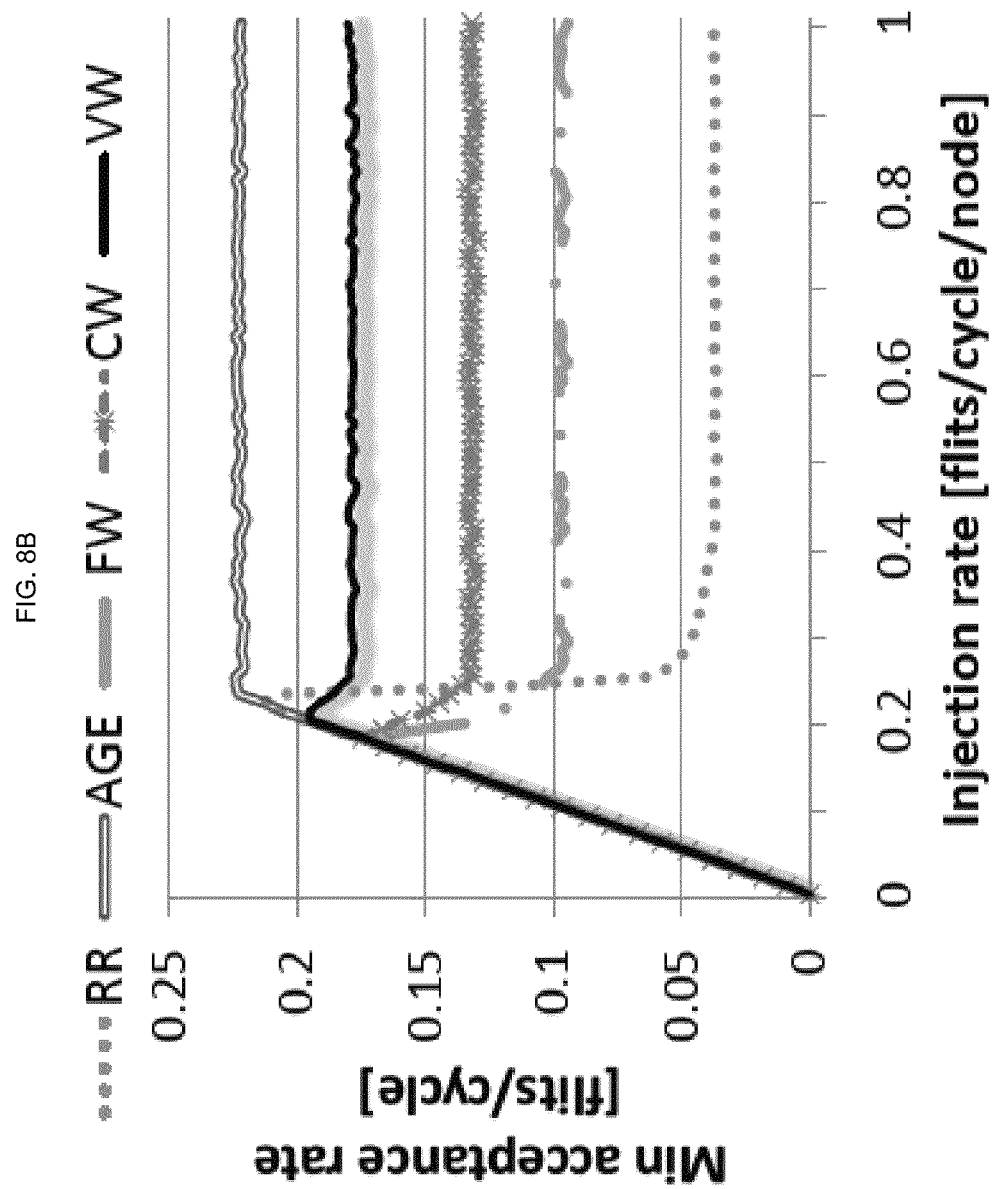
Figure 8C:
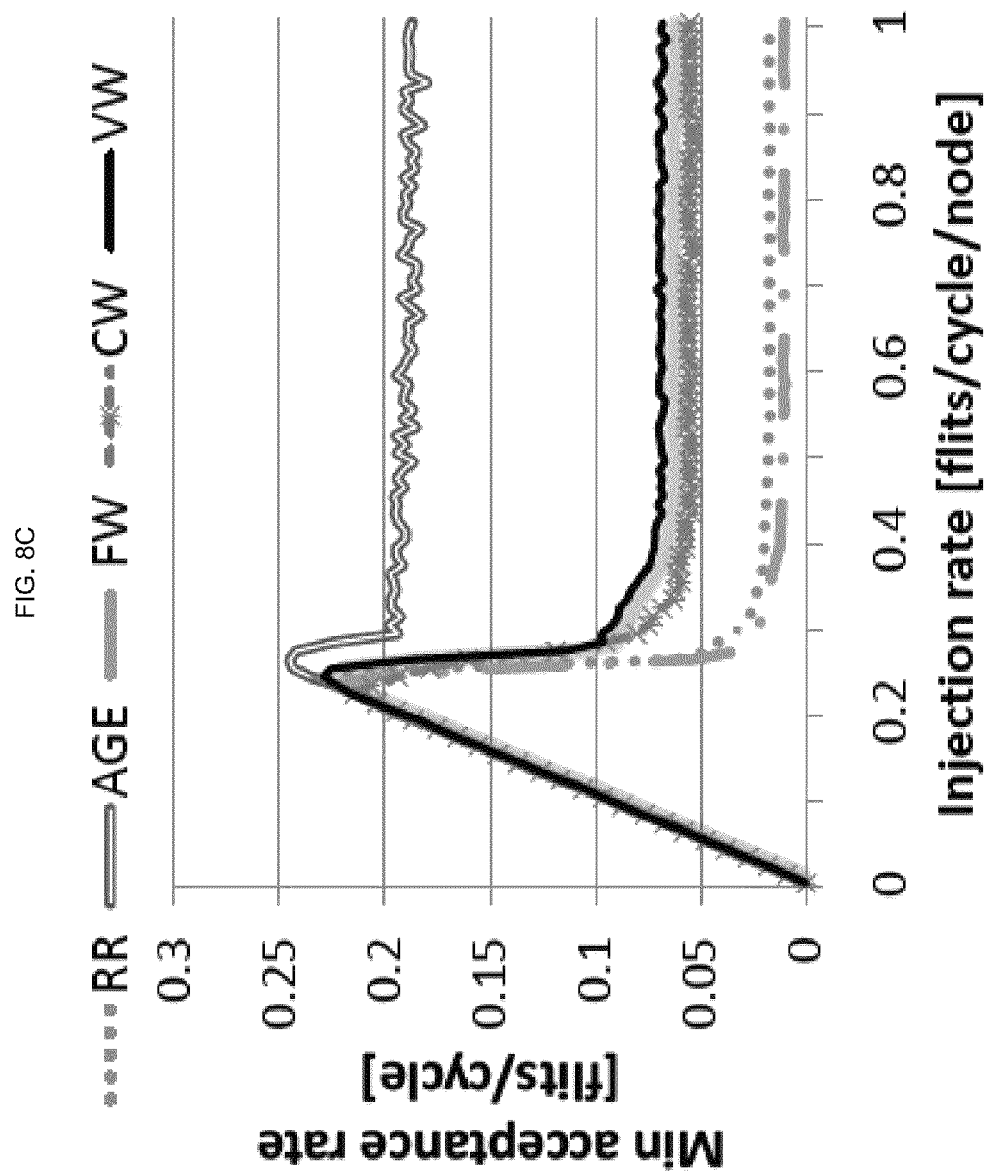

In addition to the latency vs. throughput curves of FIGS. 7A-C, the offered load vs. minimum accepted throughput has been plotted for the different traffic patterns as shown in FIGS. 8A-C. As shown, for traffic patterns such as UR, regardless of the arbitration mechanism the network continues to accept same amount of traffic past saturation. However, it is known that simple round-robin arbitration can create an unstable network for different permutation traffic. In other words, beyond the maximum saturated accepted throughput, as the load continues to increase the accepted throughput actually decreases.

By providing globally fairness with age-based arbitration, the maximum accepted throughput can be maintained as offered load continues to increase. For RR, the throughput drop significantly because of global unfairness. The different weight metrics (FW, CW, VW) provide similar saturation throughput but differ significantly on the accepted throughput as load increases beyond saturation. For example, with the transpose traffic pattern in FIG. 8A, after saturation around 0.14, as load continues to increase the throughput drop by approximately 67% for FW while CW and VW maintains stability. As shown in FIG. 8B, for bitcomp, probabilistic arbitration still provides better stability than RR, with VW again providing the highest stability compared to CW and FW. However, VW cannot achieve high sustained throughput as age-based arbitration and it is noticeable in the tornado traffic, as shown in FIG. 8C.

Figure 9:
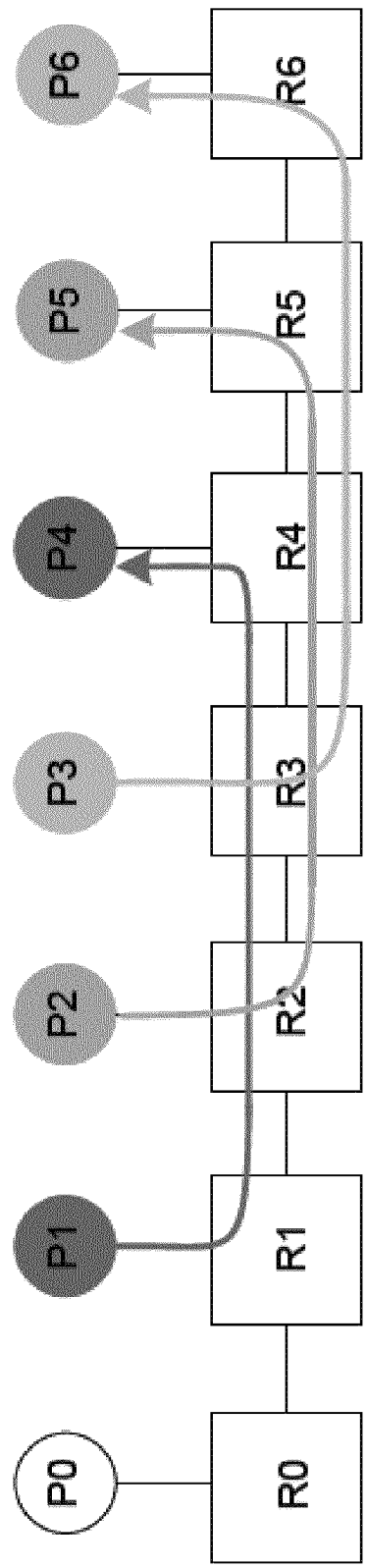
FIG. 9 illustrates a traffic pattern for fixed weight probabilistic arbitration.
Figure 10:
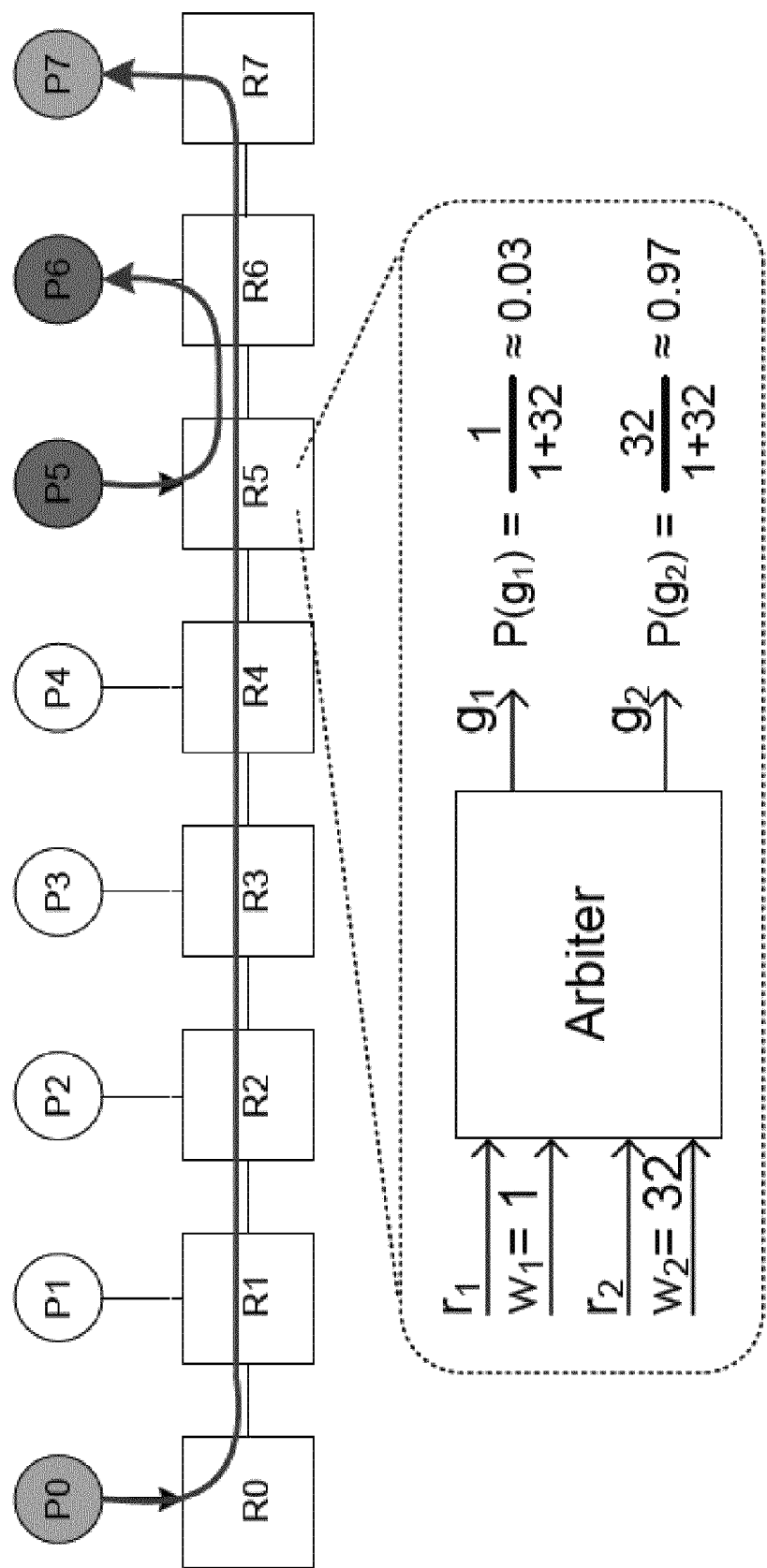
FIG. 10 illustrates a traffic pattern for constantly increasing weight probabilistic arbitration.

In order to understand the limitations of CW and FW, the traffic patterns shown in FIGS. 9 and 10 are provided. FIG. 9 highlights the limitation of the FW metric. Assume P1, P2, and P3 sends traffic to P4, P5 and P6, respectively. With this traffic pattern, all of the packets will have a hop count of $h_x=3$, $h_y=0$ and use a weight of $w=2^3$. As a result, the arbitration at each router (R2, R3, R4, R5) will be round-robin arbitration because of the equal weights. Thus, more bandwidth will be serviced to P3 while the bandwidth used by packets from P1 and P2 will be reduced geometrically—thus, reducing the minimum accepted throughput beyond saturation.

The traffic pattern in FIG. 10 highlights the limitation of CW probabilistic arbitration. Here, $r_1,w_1$ represents a packet from P0 and $r_2,w_2$ represents a packet from P5. Assume P0 sends traffic to P7 and P5 sends traffic to P6. Also assume the other nodes in the row P1-P4 are sending traffic to another node in the same column and does not require traversing any channel within this row. With a static constant degree metric using CW, the weight of packet injected at P0 continues to increase and once it reaches R5, it has a weight of 32. However, the packet injected from P5 at R5 will have weight of 1. Thus, using probabilistic arbitration, P0 will receive 32⁄33 of the bandwidth from the channel between R5 and R6 while P5 will only obtain 1⁄33 of the bandwidth—unfairly, biasing the packet that have traveled long distance.

Ideally, since there are only 2 flows sharing the channel between R5 and R6, each should access ½ the bandwidth. In order to overcome the limitation of CW, a variably increase of the weight metric is needed. Thus, for a packet that is injected at P0, it does not encounter any contention until it reaches R5 and maintains a weight of 1. At R5, w1=w2=1, and each flow from P0 and P5 will be serviced approximately equally.

Figure 11A:
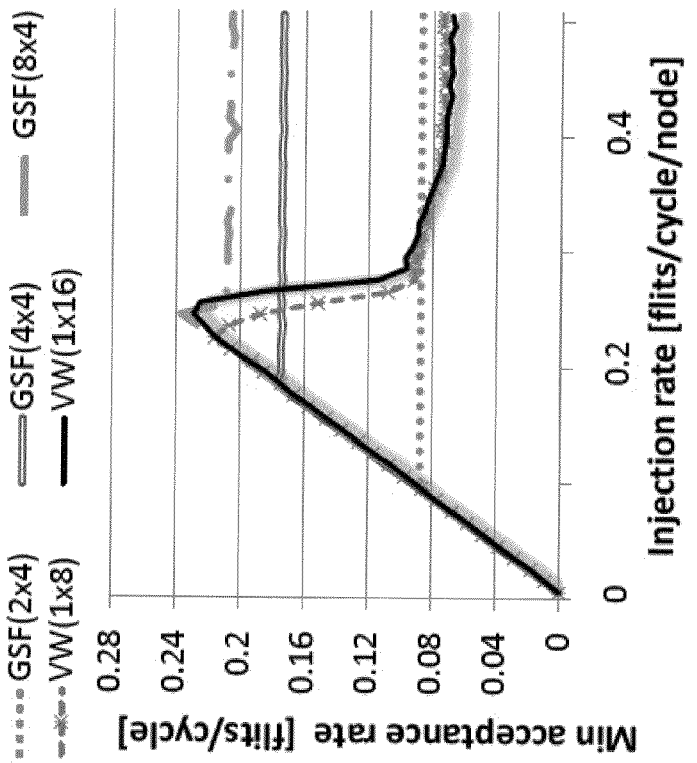
FIGS. 11A-C are plots comparing performance using globally synchronized frames and probabilistic arbitration for different traffic patterns.
Figure 11B:
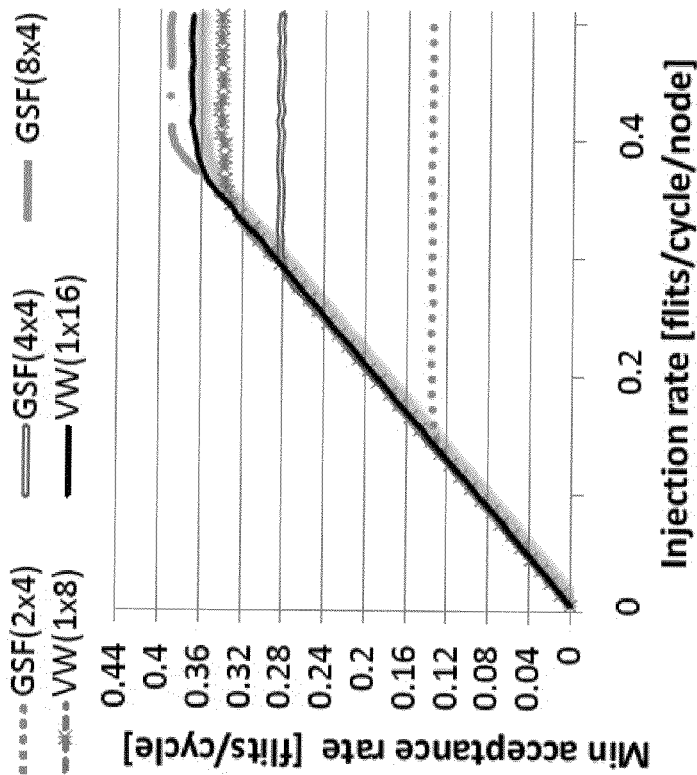
Figure 11C:
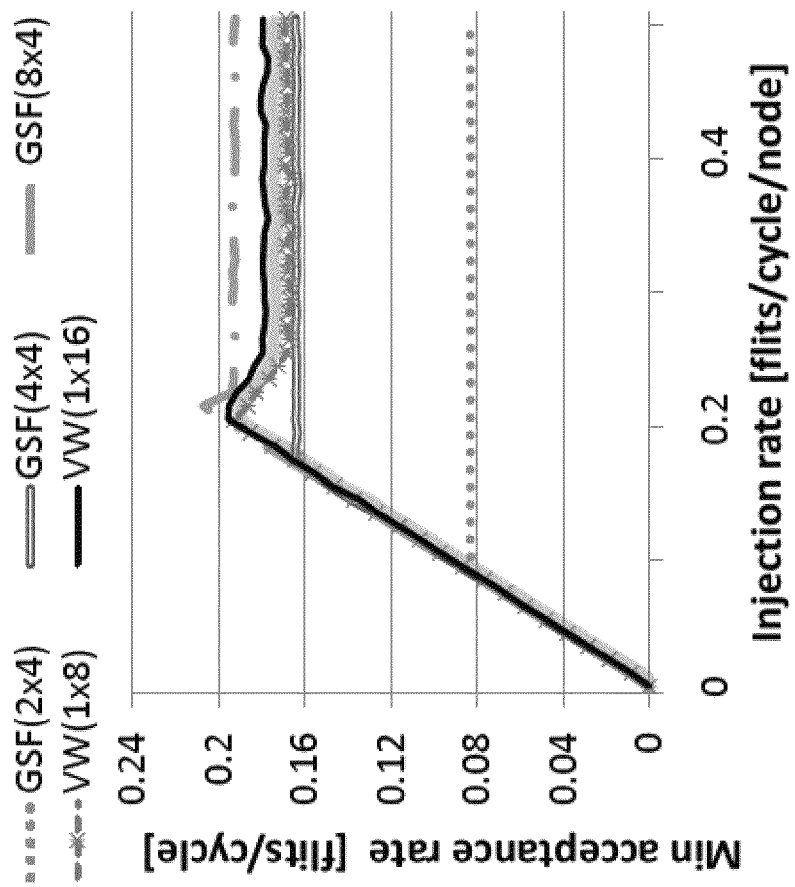

Next, the performance of probabilistic arbitration according to aspects of the invention is compared with a QoS scheme for on-chip networks called globally synchronized frames ("GSF"). GSF takes a frame-based approach as time is coarsely quantized into frames. Injection control logic at each source node controls bandwidth allocation by restricting the number of flits that each traffic flow can inject into each frame. FIGS. 11A-C shows a minimum accepted throughput versus injection rate using both GSF and probabilistic arbitration (VW) with multiple buffer configurations for three traffic patterns. FIG. 11A is for a uniform random pattern, FIG. 11B is for a tornado pattern, and FIG. 11C is for a bitcomp traffic pattern. For these figures, V×B in parentheses indicates the buffer configuration, namely the number of virtual channels (VCs) per physical link (V)×buffer size per VC (B).

The throughput of GSF suffers when the buffer size is small and clearly shows how GSF is sensitive to the number of virtual channels (VCs). For example, when the number of VCs is only two, namely for GSF(2×4), the network utilization of GSF is low because there is only one future frame (assuming one VC per frame), which is not sufficient to hide the drain time of the head frame. On the other hand, probabilistic arbitration shows generally higher minimum throughput for the same buffer size (e.g., GSF(2×4) versus VW(1×8) and GSF(4×4) versus VW(1×16)). However, for traffic such as tornado traffic, the performance of VW and probabilistic arbitration suffers at high loads because of the limitation of contention-based arbitration that is used with VW weight metric.

As mentioned above, probabilistic arbitration may create starvation. For example, in FIG. 2, the probability that $r_1$ with $w_1$ will not be serviced for n consecutive cycles is $(1-P(g_1))n$, assuming $r_2$ also has a request for n consecutive cycles with the same weight $w_2$. Theoretically, as n→∞, all requests will be eventually served but n can get very large.

Figure 12:
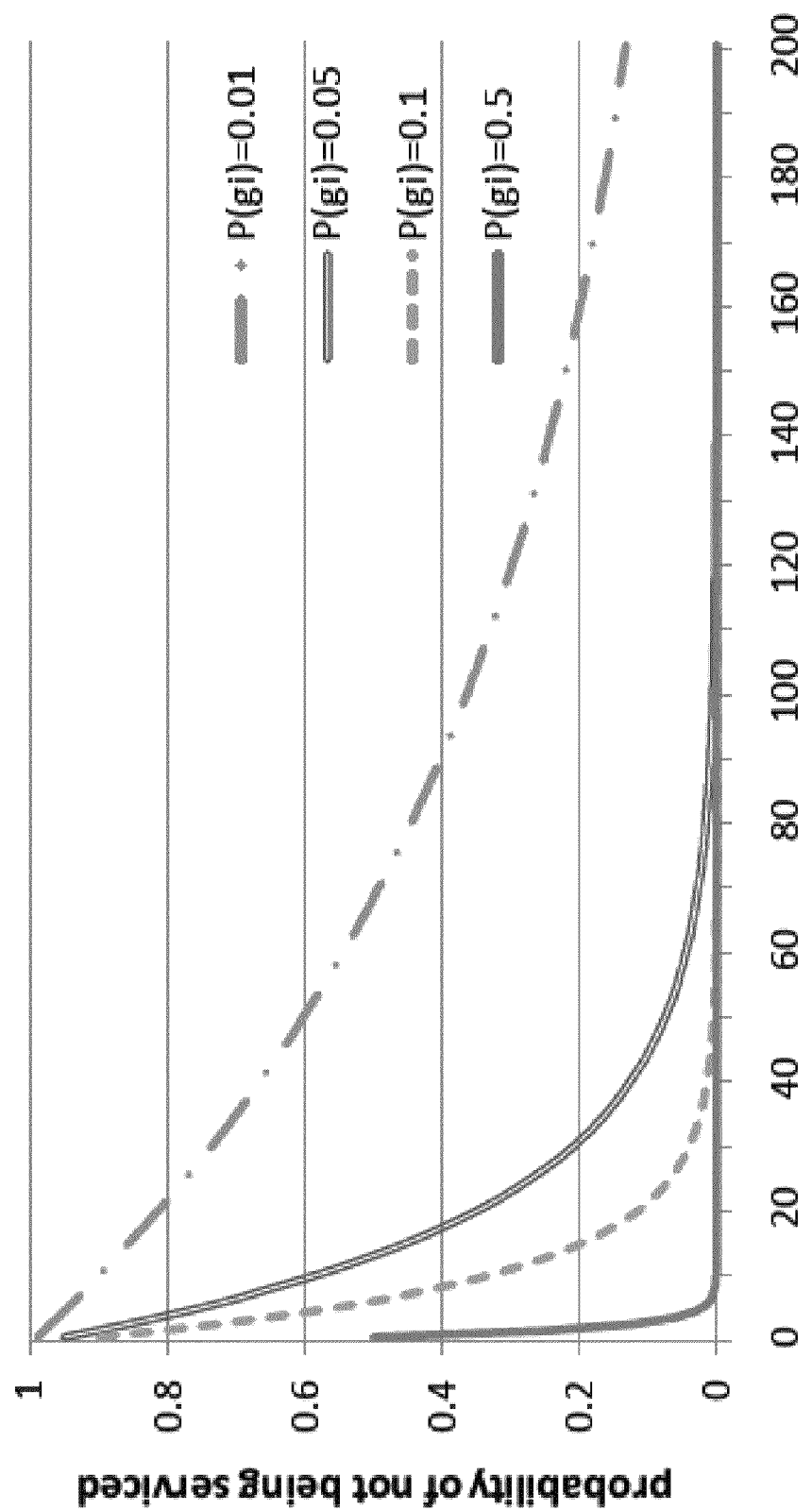
FIG. 12 plots the probability of a packet not being serviced for a given number of cycles.

FIG. 12 plots the probability of a packet not being serviced for n consecutive cycles as P(gi) is varied. For P(gi)>0.1, the probability quickly converges to zero and there is minimal impact of starvation using probabilistic arbitration. For P(gi) ≤0.1, in the worst case, there is a chance that a packet will not be serviced for large number of cycles and that it will get only worse with smaller values of P(gi). Nonetheless, as shown, as the number of cycles (n) increase, the probability of being services increases to 1.

However, even with a globally fair arbitration process such as age-based arbitration or weighted fair queuing, in a traffic pattern such as hotspot traffic, each node's traffic will only be serviced every N cycles, where N is the number of nodes in the network. Thus, for N=64, the probability of a packet being serviced within 64 cycles (n=64) with probabilistic arbitration (P(gi)=0.01) will be approximately 0.5. In addition, FIG. 12 represents an upper bound on the probability of a packet not being serviced, as it is assumed that other requests are continually asserted such that P(gi) remains constant. If in the next cycle the number of requests is reduced, P(gi) will increase, thus, reducing the probability of a packet not being serviced.

Figure 13:
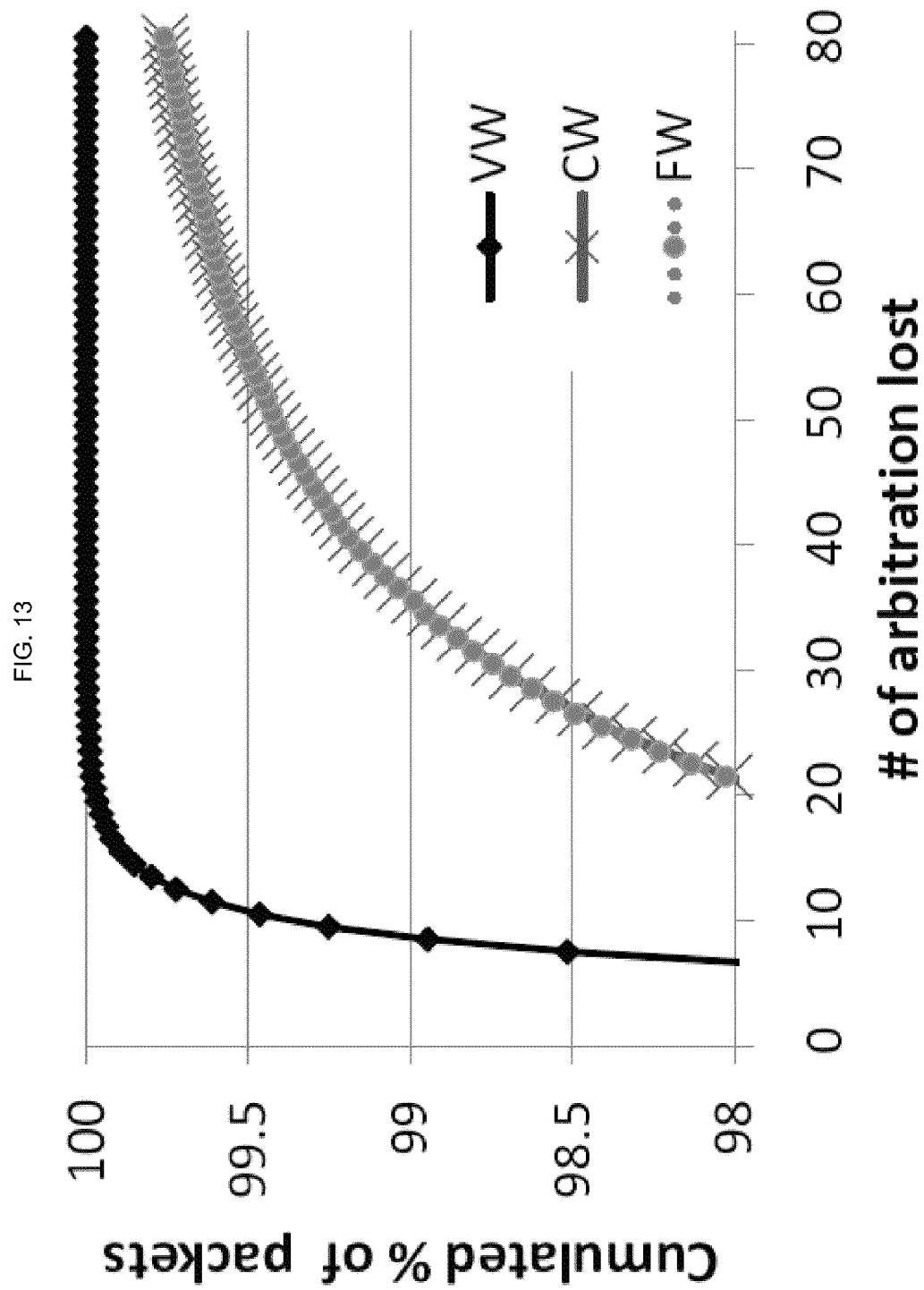
FIG. 13 plots the number of packet cycles each packet loses arbitration for different weight metrics.

In FIG. 13, a plot is provided of the total number of times (or cycles) each packet loses arbitration for the different weight metrics on the x-axis and the percentage of packets in the y-dimension. This metric is obtained by counting the total number of requests made to the probabilistic arbiter for each packet en route to its destination and subtracting the hop count from source to its destination, which corresponds to the number of successful arbitration.

Exemplary hotspot traffic as discussed above, because that represents a worst-case traffic pattern for starvation as some packet needs to traverse the maximum network diameter to reach its destination—resulting in the highest weight and creating the highest probability of starvation for packets near the hotspot destination. In an exemplary scenario, an injection rate of 0.015 is used at each node, which approximately corresponds to the maximum achievable throughput for each node with the hotspot traffic (≈1⁄64). As shown in FIG. 13, FW and CW may take very long to converge to 100%; in contrast, with VW the convergence occurs much faster as the number of times a packet loses probabilistic arbitration is under 20.

With VW, a packet's weight does not always constantly increase and minimizes packets with large values—resulting in higher values of P(gi) and fewer number of cycles waiting for lost arbitration. However, if starvation avoidance is to be guaranteed, the probabilistic arbiter may employ a fall-back mechanism. For example, if a request is not serviced for n cycles, the arbiter falls back to a simple round-robin arbiter for some number of cycles to ensure that everyone does get serviced at least once every n cycles.

One can view the cost of an on-chip router, in terms of area and power, as being dominated by the buffers and the crossbar. Prior work has shown that the area and power consumption impact of arbitration is minimal. For example, in one instance the power consumption of arbitration was approximately 2.5% of the total power consumption. Thus, the additional complexity of implementing distance-based, probabilistic arbitration on the router area and energy should be relatively small.

However, the latency of arbitration is often the critical path in a router. If not implemented properly, a probabilistic arbiter can create a bottleneck. A block diagram of an exemplary probabilistic arbiter module 1400 is shown in FIG. 14. As shown, the arbiter module may be broken into separate logical sections. The first section 1402 performs weighting operation. The second section 1404 provides one example of a random weighted arbiter.

In the first section 1402, the nonlinear weights are calculated based on the number of hops (h) and contention degree (C) parameters. Here, h is desirably the number of hops within the currently traveled dimension, and not a "Manhattan" distance computation of the hop distance. An exponential calculation ("EXP") is performed using the parameters, for instance $C^h$. All of the weights are desirably summed together to obtain a total weight $W_T$. Based on the value of $W_T$, section 1404 may employ a random number generator to generate a random number of between 0 and $W_T-1$. Depending on the range of the random number, the appropriate grant is asserted.

In the present scenario, the focus is on VW instead of CW or FW because of VW's performance advantage. The configuration shown in FIG. 14 can be implemented using different techniques. For example, the random number generator may be implemented using a linear feedback shift register.

However, the random number is dependent on the $W_T$ that increases the critical path. To avoid this critical path, the random number can be pre-generated based on the maximum weight possible in the network. Once $W_T$ is calculated, the random value can be selected using the lower $\log(W_T)$ bits of the pre-generated random number. By using this technique, it is estimated that the arbitration delay of probabilistic arbitration (VW) is approximately 15 fan-out 4 delay ("FO4"), which includes the adder, multiplexer, comparator, and the selector logic, compared with a conventional arbiter at 10 or 11 FO4.

The critical path can be further reduced by a tradeoff of complexity with accuracy. For example, the weights can be approximated by using only m of n bits. Additional design tradeoffs can be made between router complexity and on-chip bandwidth. In other words, router complexity may be increased by completely recalculating the weight at each router or by increasing the on-chip bandwidth usage by carrying around the weight (or partial weight) within the head flit, as this simplifies the calculation of the new weight.

In addition, one may qualitatively compare VW-type probabilistic arbitration according to aspects of the invention with age-based arbitration as shown in Table IV. Here, the age-based arbitration is based on the implementation from the Cray XT3.

TABLE IV

Qualitative comparison of age-based arbitration with a VW algorithm.

| | age-based arbitration | VW |
|---|---|---|
| arbitration | deterministic | probabilistic |
| weight metric | age. clock | hop count, contention |
| weight management | global management needed within each router to track packets in each epoch | per-packet based |
| weight rollover | counter saturation, starvation | not needed |
| weight update | every clock cycle | every hop |

Assuming both age-based and VW-type arbitration carry an n-bit field to represent the weight, the main difference is how this weight maintained. For VW, this weight is only updated once per router and does not need any special maintenance. However, with age-based arbitration, the age field will eventually saturate and reach the maximum value. As a result, careful maintenance is need such that when the counter does roll-over, proper age is maintained while starvation is avoided. This is not an issue with VW-type probabilistic arbitration.

Probabilistic techniques for centralized arbitration/scheduling have been proposed in OS scheduling and system-on-chip shared bus systems. In lottery scheduling, a thread is chosen to run using random numbers, using probabilistic arbitrations to choose the owner of a shared bus. Probabilistic arbitration has also been proposed within memory schedulers, using a single centralized arbiter/scheduler. In addition, distance or hop count has also been used in arbitration within the A'ergia architecture, in which hop count is used to determine slack calculations and to provide application-level fairness. In contrast, aspects of the invention use multiple distributed probabilistic arbiters in on-chip networks. In an additional aspect, weight metrics are employed to achieve fairness with the probabilistic arbiter.

As discussed herein, distance-based, probabilistic arbitration is desirably employed to provide equality-of-service in systems such as many-core CMPs. By only modifying the arbitration of on-chip network routers, it has been shown how probabilistic arbitration according to aspects of the invention approaches the behavior of ideal age-based arbitration without requiring any significant complexity and relying only on local arbitration. Heuristics based on hop count may be used to approximate age.

Along with a probabilistic arbiter, livelock-free arbitration is achievable that avoids starvation. Different arbitration weight metrics including fixed weight, constantly increasing weight, and variably increasing weight have been described which rely on nonlinear weights to provide equal and fair service to nodes that are farther away. As shown, simulation results illustrate that there is minimum degradation of performance across a wide range of traffic patterns in evaluating non-equal and fair service aspect of using probabilistic arbitration. By providing better global fairness, distance-based, probabilistic arbitration ds also able to provide a more stable network as it is able to continue delivering throughput that is close to the peak throughput when the offered load is beyond the saturation throughput.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of routing data packets in an interconnection network, the method comprising:
    receiving a plurality of data packets at a node in the interconnection network;
    analyzing, with a processor, content of the data packets to determine a source node and a destination node for the data packet; and
    performing distance-based arbitration at the node to determine an order for routing the data packets from the node to a next node in the interconnection network, the distance-based arbitration comprising probabilistic arbitration based on weights of different input requests at the node;

wherein the probabilistic arbitration is based on nonlinear weights of one or more of the input requests for selected ones of the plurality of data packets, the nonlinear weights being associated with distance information regarding the destination node, wherein the distance information regarding the destination node comprises a hop count identifying a number of hops that separate the source node and the destination node in a given dimension, and wherein the nonlinear weights (w) are selected using the hop count (h) and a contention degree (C) according to the following equation:

$$w=C^h.$$

2. The method of claim 1, wherein the distance information regarding the destination node comprises a hop count identifying a number of hops that separate the source node and the destination node in a given dimension.

3. The method of claim 1, wherein the contention degree C is dependent on a location of the destination node in the interconnection network.

4. The method of claim 1, wherein the nonlinear weights are fixed weights based on a static value of the hop count.

5. The method of claim 1, wherein the nonlinear weights are based on a variable contention degree.

6. A method of routing data packets in an interconnection network, the method comprising:

receiving a plurality of data packets at a node in the interconnection network;

analyzing, with a processor, content of the data packets to determine a source node and a destination node for the data packet; and performing distance-based arbitration at the node to determine an order for routing the data packets from the node to a next node in the interconnection network, the distance-based arbitration comprising probabilistic arbitration based on weights of different input requests at the node;

wherein the probabilistic arbitration is based on nonlinear weights of one or more of the input requests for selected ones of the plurality of data packets, the nonlinear weights being associated with distance information regarding the destination node, wherein the distance information regarding the destination node comprises a hop count identifying a number of hops that separate the source node and the destination node in a given dimension, wherein the nonlinear weights are fixed weights based on a static value of the hop count, and wherein the interconnection network has a first (x) dimension and a second (y) dimension, the nonlinear weights when traversing the x-dimension are determined according to $w=2^{hx}$, and the nonlinear weights when traversing the y-dimension are determined according to $w=2^{hx} \times C^{hy}$.

7. The method of claim 6, wherein the content of the data packets headers remains constant throughout the interconnection network.

8. A device, comprising:

a plurality of input ports for receiving data packets from one or more source nodes in an interconnection network;

a plurality of output ports for sending the data packets to one or more destination nodes in the interconnection network; and an arbiter configured to perform distance-based arbitration on the received data packets to determine an order for routing the received data packets to respective subsequent nodes in the interconnection network, the distance-based arbitration comprising probabilistic arbitration based on weights of different input requests for different ones of the received data packets including the given data packet;

wherein the arbiter is configured to perform probabilistic arbitration based on nonlinear weights of one or more of the input requests for selected ones of the received data packets, the nonlinear weights being associated with distance information regarding the destination node for the given data packet, wherein the distance information regarding the destination node comprises a hop count identifying a number of hops that separate the source node for the given data packet and the destination node for the given data packet in a given dimension, and wherein the nonlinear weights (w) are selected using the hop count (h) and a contention degree (C) according to the following equation:

$$w=C^h.$$

9. A device, comprising:

a plurality of input ports for receiving data packets from one or more source nodes in an interconnection network;

a plurality of output ports for sending the data packets to one or more destination nodes in the interconnection network; and an arbiter configured to perform distance-based arbitration on the received data packets to determine an order for routing the received data packets to respective subsequent nodes in the interconnection network, the distance-based arbitration comprising probabilistic arbitration based on weights of different input requests for different ones of the received data packets including the given data packet;

wherein the arbiter is configured to perform probabilistic arbitration based on nonlinear weights of one or more of the input requests for selected ones of the received data packets, the nonlinear weights being associated with distance information regarding the destination node for the given data packet, wherein the distance information regarding the destination node comprises a hop count identifying a number of hops that separate the source node for the given data packet and the destination node for the given data packet in a given dimension, wherein the nonlinear weights (w) are fixed weights based on a static value of the hop count (h), and wherein the interconnection network has a first (x) dimension and a second (y) dimension, the nonlinear weights when traversing the x-dimension are determined according to $w=2^{hx}$, and the nonlinear weights when traversing the y-dimension are determined according to $w=2^{hx} \times C^{hy}$.

10. A method of routing data packets in an interconnection network, the method comprising:

receiving a plurality of data packets at a node in the interconnection network;

analyzing, with a processor, content of the data packets to determine a source node and a destination node for the data packet; and performing distance-based arbitration at the node to determine an order for routing the data packets from the node to a next node in the interconnection network, the distance-based arbitration comprising probabilistic arbitration based on weights of different input requests at the node, each input request being for a different packet, wherein, for a given input request ($r_i$), a probability (P) of that request being granted ($g_i$) is determined based on incoming weights (w) of the different input requests (m) according to the following equation:

$$P(g_i) = \frac{w_i}{\sum_{j=1}^{j=m} w_j}.$$

11. A device comprising:
a plurality of input ports for receiving data packets from one or more source nodes in an interconnection network;
a plurality of output ports for sending the data packets to one or more destination nodes in the interconnection network; and
an arbiter configured to perform distance-based arbitration on the received data packets to determine an order for routing the received data packets to respective subsequent nodes in the interconnection network, the distance-based arbitration comprising probabilistic arbitration based on weights of different input requests for different ones of the received data packets including the given data packet, each input request being for a different packet,
wherein, for a given input request ($r_i$), a probability (P) of that request being granted ($g_i$) is determined by the arbiter based on incoming weights (w) of the different input requests (m) according to the following equation:

$$P(g_i) = \frac{w_i}{\sum_{j=1}^{j=m} w_j}.$$

12. A system comprising a plurality of nodes connected to form at least part of an interconnection network, each node including:
a plurality of input ports for receiving data packets from one or more source nodes associated with the interconnection network;
a plurality of output ports for sending the data packets to one or more destination nodes associated with the interconnection network; and
an arbiter configured to perform distance-based arbitration on the received data packets to determine an order for routing the received data packets to respective subsequent nodes in the interconnection network, the distance-based arbitration comprising probabilistic arbitration based on weights of different input requests for different ones of the received data packets including the given data packet, each input request being for a different packet,
wherein, for a given input request ($r_i$), a probability (P) of that request being granted ($g_i$) is determined by the arbiter based on incoming weights (w) of the different input requests (m) according to the following equation:

$$P(g_i) = \frac{w_i}{\sum_{j=1}^{j=m} w_j}.$$

13. The system of claim 12, wherein the interconnection network is an on-chip network.

* * * * *